(12) United States Patent
Kagawa et al.

(10) Patent No.: US 12,078,960 B2
(45) Date of Patent: Sep. 3, 2024

(54) TONER AND METHOD FOR PRODUCING TONER

(71) Applicant: CANON KABUSHIKI KAISHA, Tokyo (JP)

(72) Inventors: Hiroki Kagawa, Shizuoka (JP); Shuhei Moribe, Shizuoka (JP); Shuntaro Watanabe, Kanagawa (JP); Hiroki Akiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 17/493,309

(22) Filed: Oct. 4, 2021

(65) Prior Publication Data
US 2022/0107574 A1    Apr. 7, 2022

(30) Foreign Application Priority Data

Oct. 5, 2020   (JP) .................................. 2020-168582
Sep. 3, 2021   (JP) .................................. 2021-143745

(51) Int. Cl.
| | |
|---|---|
| *G03G 9/087* | (2006.01) |
| *C08F 220/18* | (2006.01) |
| *C08F 220/46* | (2006.01) |
| *C08G 63/183* | (2006.01) |
| *G03G 9/08* | (2006.01) |

(52) U.S. Cl.
CPC ... *G03G 9/08731* (2013.01); *C08F 220/1818* (2020.02); *C08F 220/46* (2013.01); *C08G 63/183* (2013.01); *G03G 9/081* (2013.01); *G03G 9/0815* (2013.01); *G03G 9/0819* (2013.01); *G03G 9/0821* (2013.01); *G03G 9/08755* (2013.01)

(58) Field of Classification Search
CPC .. G03G 9/08731; G03G 9/081; G03G 9/0815; G03G 9/0819; G03G 9/0821; G03G 9/08755
See application file for complete search history.

(56) References Cited

U.S. PATENT DOCUMENTS 7,846,630 B2 *  12/2010  Murakami ......... G03G 9/08755
                                                   430/105

FOREIGN PATENT DOCUMENTS

| JP | 2014130243 A | 7/2014 |
|---|---|---|
| WO | 2019/073731 A1 | 4/2019 |

* cited by examiner

*Primary Examiner* — Peter L Vajda
*Assistant Examiner* — Boone Alexander Evans
(74) *Attorney, Agent, or Firm* — Canon U.S.A., Inc. IP Division

(57) ABSTRACT

A toner including toner particles having a resin component containing a crystalline resin and an amorphous resin, in which the resin component contains a tetrahydrofuran-insoluble component, and the content of the tetrahydrofuran-insoluble component with respect to the content of the resin component is 5.0% to 80.0% by mass, wherein a maximum endothermic peak temperature of the tetrahydrofuran-insoluble component is 55.0 to 80.0° C., and the amount of heat absorption in the maximum endothermic peak of the tetrahydrofuran-insoluble component is 10.0 to 80.0 J/g, and toner particles have a structure which comprises a matrix containing the crystalline resin and domains containing the amorphous resin.

9 Claims, 1 Drawing Sheet

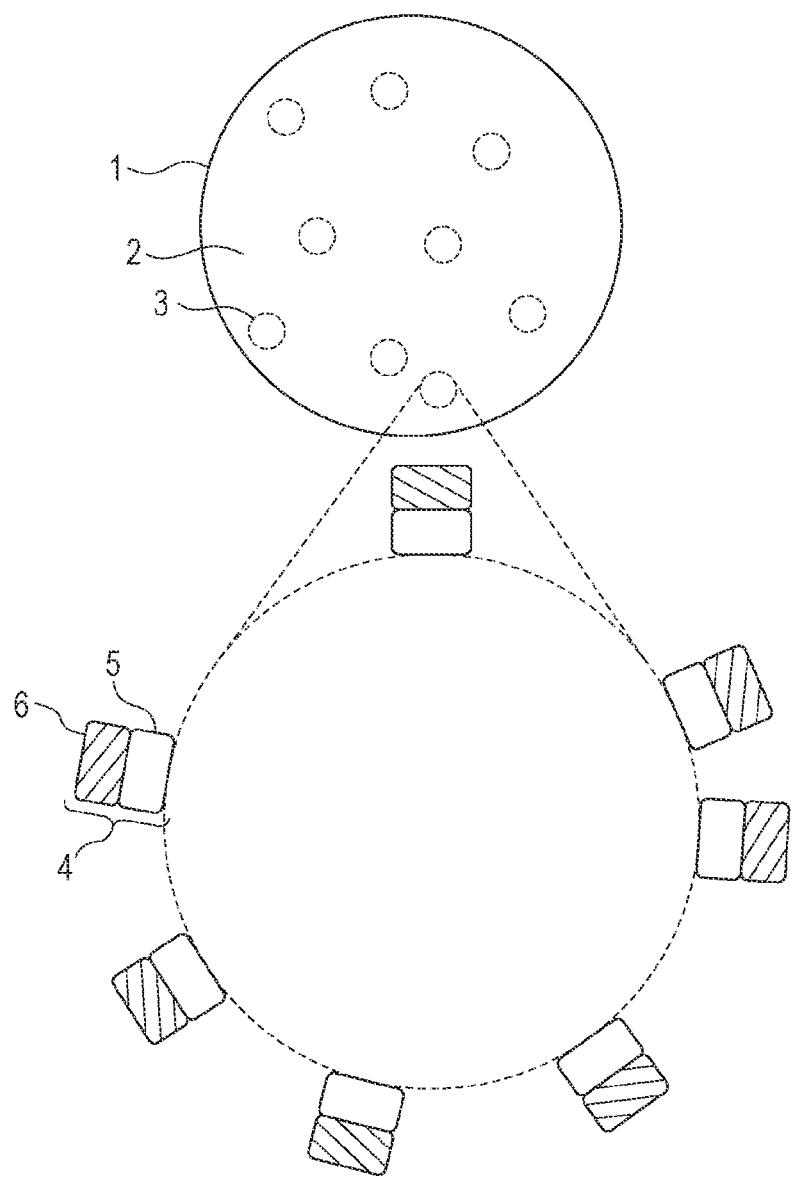

TONER AND METHOD FOR PRODUCING TONER

BACKGROUND

The present disclosure relates to a toner used for electrophotographic image-forming apparatuses.

DESCRIPTION OF THE RELATED ART

In recent years, there has been a growing demand for energy saving in electrophotographic image-forming apparatuses. As measures to save energy, toners with superior low-temperature fixability are required to reduce the amounts of heat used for fixing toners.

To improve the low-temperature fixability of a toner, a method of using a crystalline resin in a toner has been studied. Amorphous resins, which are commonly used as binder resins for toners, do not exhibit a clear endothermic peak in differential scanning calorimetry (DSC) measurements. Crystalline resins exhibit endothermic peaks in DSC measurements. Crystalline resins have regular arrangements of intermolecular or intramolecular long-chain alkyl groups and thus have the property that they hardly soften up to their melting points. Because of this property, crystalline resins melt rapidly at their melting points, i.e., melt sharply, thereby resulting in a rapid decrease in viscosity For this reason, crystalline resins have been receiving attention as materials that have superior sharp-melting properties and improve the low-temperature fixability of toners. Known examples of crystalline resins include crystalline vinyl resins. Crystalline vinyl resins are vinyl polymers including monomer units containing long-chain alkyl groups. That is, crystalline vinyl resins have main chains (backbones) and long-chain alkyl groups serving as side chains. The long alkyl groups of the side chains are regularly arranged with each other and crystallize, so that the crystallinity of crystalline vinyl resins is exhibited.

Toners with high crystalline resin contents have poor high-temperature elasticity and are prone to the occurrence of high-temperature offset. A method is known in which the incorporation of crystalline and amorphous resins into a toner achieves sufficient high-temperature elasticity.

International Publication No. WO2019/073731 reports a toner containing a cross-linked polyester and a crystalline vinyl resin in order to improve low-temperature fixability and high-temperature offset resistance.

The inventors have examined the toner described in WO2019/073731 and have found that the developing performance of the toner tends to deteriorate when an image is output in a low-temperature and low-humidity environment. Specifically, it was found that a non-image region in a fixed image was easily soiled.

SUMMARY

At least one aspect of the present disclosure is directed to providing a toner that can be superior in low-temperature fixability and high-temperature offset resistance and that can be superior in developing performance in a low-temperature and low-humidity environment.

According to one aspect of the present disclosure, there is provided a toner including toner particles that contain a resin component containing a crystalline resin and an amorphous resin, in which the resin component contains a tetrahydrofuran-insoluble component, and the content of the tetrahydrofuran-insoluble component with respect to the content of the resin component is 5.0% to 80.0% by mass, in which when a maximum endothermic peak temperature in a differential scanning calorimetry measurement (DSC measurement) of the tetrahydrofuran-insoluble component is defined as Tm. [° C.], and when the amount of heat absorption in the maximum endothermic peak determined from DSC measurement of the tetrahydrofuran-insoluble component is defined as H(I) [J/g], Tm [° C.] satisfies formula (1): $55.0 \leq Tm \leq 80.0$ ... (1), and H(I) [J/g] satisfies formula (2): $10.0 \leq H(I) \leq 80.0$ ... (2), and in which when cross sections of 100 particles of the toner particles are observed, each of the cross sections has a domain-matrix structure which includes a matrix containing the crystalline resin, and domains each of which contains the amorphous resin, and among the 100 particles, the number of particle in which all the domains have a major diameter of 1.0 μm or less is 20 particles or more. According to one aspect of the present disclosure, it is possible to provide a toner that can be superior in low-temperature fixability and high-temperature offset resistance and that can be superior in developing performance in a low-temperature and low-humidity environment.

Further features of the present disclosure will become apparent from the following description of exemplary embodiments with reference to the attached drawing.

BRIEF DESCRIPTION OF THE DRAWINGS

FIGURE is a schematic cross-sectional view of a toner particle according to an embodiment of the present disclosure for the purpose of illustrating an assumed mechanism for providing the effect of the present disclosure.

DESCRIPTION OF THE EMBODIMENTS

Unless otherwise specified, the expressions "XX or more and YY or less" and "XX to YY" refer to a numerical range that includes the lower and upper limits, which are end points.

The term "(meth)acrylate" refers to acrylate and/or methacrylate. The term "(meth)acrylic acid" refers to acrylic acid and/or methacrylic acid.

When the numerical ranges are described in a stepwise manner, the upper and lower limits of each numerical range can be freely combined.

A monomer unit is a moiety (unit) contained in a polymer (polymeric material), and refers to the reacted form of a monomer (polymerizable monomer). For example, one section of carbon-carbon bonds in the main chain of a polymer formed by the polymerization of vinyl monomers is regarded as one monomer unit. The vinyl monomer can be represented by the following formula (Z). The vinyl monomer unit is the constitutional unit of the polymer and is formed by the reaction of the monomer represented by formula (Z) below. The vinyl monomers undergo a polymerization reaction to form a vinyl polymer. The monomer unit may also be referred to simply as a "unit".

In formula (Z), $R_{Z1}$ is a hydrogen atom or an alkyl group, and $R_{Z2}$ is any substituent.

A crystalline resin is a resin that exhibits a clear endothermic peak in a differential scanning calorimetry (DSC) measurement in the form of resin, toner particles, or toner, as a measurement sample.

The term "THF" refers to tetrahydrofuran.

In the cross-sectional observation of toner particles, a crystalline resin-containing portion refers to a portion having a gray level of 127 or less when a change in luminance from black to white is defined as 0 to 255 gray levels in the image analysis of the cross-sectional image of the toner particles stained by ruthenium staining as described below. Similarly, an amorphous resin-containing portion refers to a portion having a gray level of 128 or more. When a binarization process is performed in which portions having a gray level of 127 or less are black and portions having a gray level of 128 or more are white, portions mainly composed of the crystalline resin appear black, and portions mainly composed of the amorphous resin appear white.

The inventors have conducted intensive studies and have found that a toner having the above-mentioned constituent features can have superior low-temperature fixability and superior developing performance. A conceivable mechanism and the constituent features will be described in detail below.

Mechanism of Manifestation of Effect of the Present Disclosure

The inventors speculate the mechanism by which the effects of the present disclosure are provided, as described below.

The toner contains a resin component containing a tetrahydrofuran-insoluble component (hereinafter, tetrahydrofuran is also referred to as "THF") and thus has superior high-temperature offset resistance. This is because resins insoluble in THF commonly have superior high-temperature elasticity.

When the THF insoluble content satisfies the above formulae (1) and (2), the resin component contained in the toner is easily plasticized at low temperatures, thereby achieving both superior high-temperature offset resistance and superior low-temperature fixability.

In the cross-sectional observation of the toner particles, the fact that the matrix containing the crystalline resin is observed indicates that the physical properties of the toner tend to depend on the crystalline resin, and thus the toner has superior low-temperature fixability. The fact that domains containing an amorphous resin are observed indicates that the toner has superior high-temperature elasticity provided by the amorphous resin, without impairing the low-temperature fixability provided by the crystalline resin, thus achieving both low-temperature fixability and high-temperature offset resistance.

When cross sections of 100 particles of the toner particles are observed and when the number of toner particles in which all the domains have a major diameter of 1.0 μm or less is 20 or more among the 100 particles, toner particles free of coarsened domains are easily obtained. This results in a toner with less broadening of the charge distribution of the toner as a whole and superior developing performance.

THF-Insoluble Component

In the case where the maximum endothermic peak temperature in the differential scanning calorimetry (DSC) measurement of the tetrahydrofuran-insoluble component contained in the toner is defined as Tm [° C.] and where the amount of heat absorption in the maximum endothermic peak is defined as H(I) [J/g], Tm [° C.] satisfies formula (1) described above, and H(I) [J/g] satisfies formula (2) described above.

The THF-insoluble component in the resin component is a resin that typically has better high-temperature elasticity than THF-soluble resins, and thus improves the high-temperature offset resistance of the toner. An example of the THF-insoluble component in the resin component is a resin having a cross-linked structure.

The fact that the THF-insoluble component in the resin component satisfies the above formulae (1) and (2) indicates that the resin component contains a crystallizable resin having superior high-temperature elasticity. In the case where the THF-insoluble component satisfies formula (1), the THF-insoluble component melts at a temperature near Tm, and the resin contained in the toner is easily plasticized accordingly. This easily results in the toner having superior low-temperature fixability and high-temperature offset resistance.

When Tm is 55.0° C. or higher, the melting start temperature of the THF-insoluble component is not too low, and the fixing temperature of the toner is easily maintained appropriately. Tm is preferably 58.0° C. or higher, more preferably 60.0° C. or higher. When Tm is 80.0° C. or lower, the melting start temperature of the THF-insoluble component is not excessively high, and the resin contained in the toner is easily plasticized at a low temperature. This easily results in the toner having superior low-temperature fixability. Tm is preferably 77.0° C. or lower, more preferably 67.0° C. or lower. Tm can be controlled by, for example, the composition of the THF-insoluble component and the amount of crystallizable component in the THF-insoluble component.

The fact that H(I) mentioned above is 10.0 J/g or higher indicates that the crystalline portion of the THF-insoluble component absorbs heat, and the resin component contained in the toner is easily plasticized accordingly. H(I) is preferably 11.5 J/g or more, more preferably 13.0 J/g or more, even more preferably 16.5 J/g or more. When H(I) is 80.0 J/g or less, the heat absorption is not excessive. Thus, the crystalline portion of the THF-insoluble component is not over-plasticized, and the resin component contained in the toner is not easily over-plasticized. The elasticity of the toner is easily maintained appropriately during fixing to facilitate providing the toner having superior high-temperature offset resistance. H(I) is preferably 65.0 J/g or less, more preferably 50.0 J/g or less, even more preferably 40.0 J/g or less.

The THF-insoluble component that satisfies formulae (1) and (2) above can be introduced into the toner by mixing raw materials including the THF-insoluble component to prepare the resin component. Alternatively, the THF-insoluble component can be introduced into the toner as follows: when the crystalline resin and the amorphous resin are mixed, a radical initiator is used to cause a cross-linking reaction between the resins to prepare the resin component.

When the amount of heat absorption in a maximum endothermic peak determined from DSC measurement of the toner is defined as H(T) [J/g], H(I) [J/g] and H(T) [J/g] preferably satisfy formula (3) below.

$$3.0\% \leq H(I)/H(T) \leq 20.0\% \quad (3)$$

H(T) refers to the amount of heat absorption in the endothermic peak that contributes most to the melting of the toner. When, with respect to the amount of heat absorption in the endothermic peak that contributes most to the melting of the toner, the amount of heat absorption of the THF-insoluble component (H(I)) is in the above range, the melting of the THF-insoluble component seems to contribute to the melting of the toner in an appropriate proportion. This easily results in the toner having superior high-temperature offset resistance. The reason for this is that THF-insoluble resins typically maintain a certain degree of elasticity even at Tm or higher to allow the toner to easily maintain appropriate elasticity during fixing. Thus, H(I)/H(T) is preferably 3.0% or more, more preferably 4.0% or more. H(I)/H(T) is preferably 20.0% or less, more preferably 15.0% or less, even more preferably 12.0% or less.

H(I) and H(I)/H(T) can be controlled by, for example, adjusting the amount of the crystalline resin used in preparing the resin component and the degree of cross-linking between the crystalline resin and the amorphous resin. The degree of cross-linking can be controlled by, for example, adjusting the amount of polymerization initiator added in preparing the resin component (binder resin) and the amount of carbon-carbon double bond contained in the amorphous resin in preparing the resin component.

A content of the THF-insoluble component with respect to a content of the resin component is 5.0% to 80.0% by mass. A THF-insoluble component content of 5.0% or more by mass easily results in the toner having superior low-temperature fixability and high-temperature offset resistance. The THF-insoluble component content is preferably 20.0% or more by mass, more preferably 30.0% or more by mass. That is, the THF-insoluble component content can be in the range of 30.0% to 80.0% by mass. When the THF-insoluble component content in the resin component is 80.0% or less by mass, the elasticity of the toner is not too high and is easily maintained appropriately. The THF-insoluble component content is preferably 70.0% or less by mass, more preferably 67.0% or less by mass.

The THF-insoluble component content in the resin component can be controlled by, for example, adjusting the degree of cross-linking between the crystalline resin and the amorphous resin, and the compositions and molecular weights of the resins before cross-linking. The degree of cross-linking can be controlled by, for example, adjusting the amount of polymerization initiator added in preparing the resin component and the amount of carbon-carbon double bond contained in the amorphous resin in preparing the resin component.

Domain-Matrix Structure when cross sections of 100 particles of the toner particles are observed, each of the cross sections has a domain-matrix structure which comprises a matrix containing the crystalline resin, and domains each of which contains the amorphous resin. To form the toner particles having the domain-matrix structure described above, the resin component can be prepared by mixing the crystalline resin and the amorphous resin.

The above domain-matrix structure can be formed by controlling the ratios of the amounts and viscosities of the crystalline resin and the amorphous resin used in the production of the toner particles. The above domain-matrix structure seems to be easily formed when the crystalline resin and the amorphous resin that is not readily mixed with the crystalline resin are used in a process of mixing the resins. Examples of the amorphous resin that is not readily mixed with the crystalline resin include cross-linked amorphous resins.

among the 100 particles of the toner particles, the number of particle in which all the domains have a major diameter of 1.0 μm or less is 20 particles or more, preferably 40 or more, more preferably 60 or more, even more preferably 80 or more. The upper limit is not particularly limited, and may be 100 or less.

The inventors have found that a toner controlled as described above is less likely to have coarse domains in each toner particle and can have superior developing performance. The inventors speculate on the reason for this as described below.

The toner particles containing no coarse domains in the toner particles seem to be more likely to have a uniform amount of electrical charge in the toner particles. A larger number of toner particles having a uniform amount of electrical charge in the toner particles seem to easily lead to a sharper charge distribution of the toner as a whole to be less likely to lead to toner particles having an amount of electrical charge outside the range of the amount of electrical charge suitable for development. Such a toner is less likely to adhere to a non-image region in a fixed image and is easily developed only in an image region. Thus, the toner having superior developing performance is easily produced.

And it is conceivable that, because of a filler effect, the high temperature elasticity of the toner is likely to be sufficiently exhibited and the toner is likely to have superior high temperature elasticity.

As an example of a method of achieving the number of toner particles in which all the domains observed have a major diameter of 1.0 μm or less within the above-mentioned range, a cross-linked resin in which the high-polarity moiety of the crystalline resin and the amorphous resin are cross-linked is contained in an embodiment of the present disclosure. A mechanism for this, speculated by the present inventors, will be described with reference to FIGURE.

Cross-linked resin molecules 4, which are the above-mentioned cross-linked resin, are each formed by cross-linking the high-polarity moiety of a crystalline resin with an amorphous resin and thus have an amorphous moiety 5 originating from the amorphous resin and a crystalline moiety 6, which is a low-polarity moiety of the crystalline resin. In a toner particle 1, the amorphous moieties 5 of the cross-linked resin molecules 4 are likely to be close to domains 3, whereas the crystalline moieties 6 are likely to be directed toward a region where a matrix 2 is present. It is presumed that each of the domains 3 is likely to be present in a state in which the periphery of each domain 3 is covered with the crystalline moieties 6. The inventors speculate that the presence of the low-polarity crystalline moieties 6 on the surface layers of the domains 3 easily causes repulsion with other domains and inhibits the domains from aggregating with each other. In addition, the cross-linked resin molecules 4 contain the crystalline moieties 6 and thus seem to easily plasticize the surrounding resin, and the cross-linked resin has high elasticity at a high temperature. Accordingly, the toner having superior low-temperature fixability and high-temperature offset resistance seems to be easily obtained.

The inventors believe that the above cross-linked resin can be incorporated by allowing the compositions of the crystalline and amorphous resins used in production to satisfy formulas (5), (6), and (7) described below.

when cross sections of 100 particles of the toner particles are observed, the number of particle in which all the domains have a major diameter of 5.0 μm or more is preferably zero particle. That is, preferably, no domains having a major diameter of 5.0 μm or more is observed.

Resin Component

The resin component contains the crystalline resin and the amorphous resin. When the resin component contains the crystalline resin, the toner having superior low-temperature fixability is easily obtained. The presence of the amorphous resin facilitates the production of the toner having superior high-temperature offset resistance.

The resin component according to an embodiment of the present disclosure can be a binder resin. In other words, the toner according to an embodiment of the present disclosure can contain toner particles containing a binder resin that contains the crystalline resin and the amorphous resin, wherein the binder resin contains the tetrahydrofuran-insoluble component and a content of the tetrahydrofuran-insoluble component with respect to a content of the binder resin is 5.0% to 80.0% or less by mass.

Vinyl Polymer A and Monomer Unit A1

The crystalline resin described above can be a vinyl polymer A containing a monomer unit A1 represented by formula (A) below. When the toner contains the vinyl polymer A, the toner having superior low-temperature fixability is easily obtained. This is presumably because long-chain alkyl groups each represented by $R^2$ are easily assembled, and thus the resin component having superior crystallinity is easily obtained. The vinyl polymer A can be a THF-soluble resin.

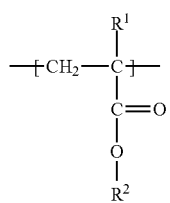
(A)

In formula (A), $R^1$ is H or $CH_3$, and $R^2$ is an alkyl group having 18 to 36 carbon atoms.

Regarding the vinyl polymer A containing the monomer unit A1, a (meth)acrylate containing an alkyl group having 18 to 36 carbon atoms can be incorporated as a monomer unit of the vinyl polymer A by vinyl polymerization of the (meth)acrylate serving as a polymerizable monomer (hereinafter, also referred to as a "first polymerizable monomer").

The first polymerizable monomer is a (meth)acrylate containing a chain hydrocarbon group having 18 to 36 carbon atoms.

Examples of the chain hydrocarbon group having 18 to 36 carbon atoms include chain unsaturated hydrocarbon groups each having 18 to 36 carbon atoms and chain saturated hydrocarbon groups each having 18 to 36 carbon atoms (hereinafter, chain saturated hydrocarbon groups are also referred to as "alkyl groups"). Examples of the (meth)acrylate containing a chain hydrocarbon group having 18 to 36 carbon atoms include (meth)acrylates each containing an alkyl group having 18 to 36 carbon atoms.

Examples of (meth)acrylates each containing an alkyl group having 18 to 36 carbon atoms include (meth)acrylates each containing a linear alkyl group having 18 to 36 carbon atoms, such as octadecyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, montanyl (meth)acrylate, myricyl (meth)acrylate, and dotriacontyl (meth)acrylate, and (meth)acrylates each containing a branched alkyl group having 18 to 36 carbon atoms, such as 2-decyltetradecyl (meth)acrylate.

Among these, from the viewpoint of achieving satisfactory low-temperature fixability and satisfactory high-temperature offset resistance of the toner, (meth)acrylates each containing a linear alkyl group having 18 to 36 carbon atoms are preferred. (Meth)acrylates each containing a linear alkyl group having 18 to 34 carbon atoms are more preferred. (Meth)acrylates each containing a linear alkyl group having 18 to 30 carbon atoms are even more preferred. At least one selected from the group consisting of stearyl (meth)acrylate and behenyl (meth)acrylate is still even more preferred.

In formula (A) above, $R^2$ is an alkyl group having 18 to 36 carbon atoms, preferably an alkyl group having 18 to 34 carbon atoms, more preferably an alkyl group having 18 to 30 carbon atoms, even more preferably an alkyl group having 18 and 22 carbon atoms. $R^2$ can be a linear alkyl group, $R^1$ can be a hydrogen atom.

One type of first polymerizable monomer may be used alone, or two or more types thereof may be used in combination. One type of monomer unit A1 may be used alone, or two or more types thereof may be used in combination.

A content of the monomer unit A1 with respect to a content of the vinyl polymer A can be 30.0% to 99.9% by mass in view of the low-temperature fixability and the developing performance of the toner. When a content of the monomer unit A1 in the vinyl polymer A is 30.0% or more by mass, crystalline moieties due to the assembly of the monomer unit A1 are easily formed, thereby easily leading to the vinyl polymer A having improved crystallinity. The presence of the vinyl polymer A in the toner easily increases the crystallinity of the matrix to allow the low-polarity crystalline moieties to easily assemble on the surface layers of the domains, thereby easily inhibiting the domains from aggregating with each other. This easily results in the toner having superior developing performance. Accordingly; a content of the monomer unit A1 in the vinyl polymer A is preferably 30.0% or more by mass, more preferably 40.0% or more by mass, even more preferably 45.0% or more by mass. When a content of the monomer unit A1 in the vinyl polymer A is 99.9% or less by mass, the vinyl polymer A does not have an excessively low polarity. Thus, an appropriate $SP_A$ value associated with an improvement in dispersibility, which will be described below, is likely to be appropriately maintained. Accordingly, a content of the monomer unit A1 in the vinyl polymer A is preferably 99.9% or less by mass, more preferably 85.0% or less by mass, even more preferably 75.0% or less by mass.

In the case where the vinyl polymer A contains two or more types of monomer units A1, the monomer unit A1 content of the vinyl polymer A is the sum of their contents.

The amount of vinyl polymer A used in the preparation of the resin component by mixing resins can be 40.0 parts or more by mass based on the sum total of 100.0 parts by mass of the resins mixed.

Monomer Unit A2

The vinyl polymer A further contains a monomer unit A2. And when the SP value of the monomer unit A1 is defined as $SP_{A1}$ $(J/cm^3)^{0.5}$, and when the SP value of the monomer unit A2 is defined as $SP_{A2}$ $(J/cm^3)^{0.5}$, $SP_{A1}$ and $SP_{A2}$ can satisfy formula (4) below.

$$3.0 \leq SP_{A2} - SP_{A1} \leq 25.0 \quad (4).$$

The SP value is an abbreviation for a solubility parameter value and serves as an indicator of solubility. The calculation method will be described below.

The units of the SP value in the present disclosure are $(J/cm^3)^{0.5}$ and can also be expressed as $(cal/cm^3)^{0.5}$ by conversion using 1 $(cal/cm^3)^{0.5} = 2.045 \times 10^3$ $(J/m^3)^{0.5}$.

When formula (4) above is satisfied, the monomer unit A2 is sufficiently more polar than the low-polarity monomer unit A1. Thus, these monomer units assemble easily by type. This can easily result in crystalline moieties due to the assembly of the monomer units A1, making it easier to obtain the toner having superior low-temperature fixability.

$SP_{A2}-SP_{A1}$ is preferably 4.0 or more, more preferably 5.0 or more, because the above effect is more pronounced. $SP_{A2}$ $SP_{A1}$ can be 25.0 or less. In this case, the compatibility between the crystalline resin and the amorphous resin is easily improved during fixing, enabling the toner to have sufficient low-temperature fixability even in a faster fixing process. In addition, the vinyl polymer A having variations in composition, such as the vinyl polymer A having a particularly large amount of monomer unit A1 or A2, is less likely to occur. This easily results in the toner having more uniform properties. Accordingly, $SP_{A2}-SP_{A1}$ is preferably 25.0 or less, more preferably 20.0 or less, even more preferably 15.0 or less.

The monomer unit A2 can be incorporated as a monomer unit of the vinyl polymer A by vinyl polymerization of a corresponding vinyl monomer serving as a polymerizable monomer. Hereinafter, the polymerizable monomer is also referred to as a "second polymerizable monomer"), and details thereof will be described below.

A vinyl monomer unit that satisfies formula (4) corresponds to the monomer unit A2. One type of monomer unit A2 may be used alone, or two or more types thereof may be used in combination. One type of second polymerizable monomer may be used alone, or two or more types thereof may be used in combination.

When the SP value of the vinyl polymer A is defined as $SP_A$ $(J/cm^3)^{0.5}$, and when the SP value of the amorphous resin used in the preparation of the resin component is defined as $SP_P$ $(J/cm^3)^{0.5}$, formulae (5) and (6) can be satisfied. Hereinafter, the amorphous resin used in the preparation of the resin component is also referred to as "amorphous resin P").

$$0<|SP_P-SP_A|\leq 10.0 \quad (5)$$

$$|SP_P-SP_A|>|SP_P-SP_{A2}| \quad (6)$$

$$6.0\leq SP_P-SP_A|10.0 \quad (7)$$

When formula (5) above is satisfied, the difference in polarity between the vinyl polymer A and the amorphous resin P is not excessively large, and the affinity between the vinyl polymer A and the amorphous resin P is easily maintained appropriately. Accordingly, the cross-linking reaction between the vinyl polymer A and the amorphous resin proceeds easily and appropriately. The presence of the cross-linked resin as described above inhibits the domains from aggregating together. Thus, the domains are less likely to coarsen. This easily results in the toner having superior developing performance. Since the affinity is maintained appropriately, the toner particles containing particularly large amounts of vinyl polymer A are less likely to be formed. The proportions of these resins in the toner particles are less likely to vary from particle to particle. The properties of the resulting toner are also less likely to vary. For the above reasons, it is preferable to satisfy formula (5) above, and it is more preferable to satisfy formula (7) above.

When formula (6) above is satisfied, the domains containing the amorphous resin are less likely to be coarsened. This easily results in the toner having superior developing performance. The inventors speculate on the mechanism by which this effect is provided, as described below.

When formula (6) above is satisfied, the amorphous resin P seemingly has a higher affinity for the monomer unit A2 having a high SP value than for the monomer unit having a low SP value, such as the monomer unit A1. For this reason, in the cross-linking reaction between the vinyl polymer A and the amorphous resin P, the cross-linked resin is presumed to be easily formed in the vicinity of the monomer unit A2. Thus, as illustrated in FIGURE, the amorphous moieties originating from the amorphous resin P in the cross-linked resin are likely to be close to the domains, and the crystalline moieties formed of the monomer units having the low SP value of the vinyl polymer A are likely to be directed toward the matrix. The repulsion that acts between the crystalline moieties of the cross-linked resin and other domains seems to easily hinder the aggregation of the domains. This seems to inhibit the formation of coarse domains formed by the aggregation of the domains.

A content of the monomer unit A2 with respect to a content of the vinyl polymer A can be 1.0% to 70.0% by mass. When a content of the monomer unit A2 is in the above range, the above $SP_A$ is easily controlled appropriately, and formulae (5), (6), and (7) above are easily satisfied.

When a content of the monomer unit A2 in the vinyl polymer A is 1.0% or more by mass, the elasticity of the vinyl polymer A does not easily deteriorate, and the high-temperature offset resistance of the toner does not easily deteriorate. In addition, the crystalline moieties due to the assembly of the monomer units A1 are easily formed, thereby easily resulting in the toner having superior low-temperature fixability. Accordingly, a content of the monomer unit A2 in the vinyl polymer A is preferably 1.0% or more by mass, mote preferably 10.0% Or more by mass, even more preferably 20.0% or more by mass. When a content of the monomer unit A2 in the vinyl polymer A is 70.0% or less by mass, the crystallinity of the vinyl polymer A is less likely to deteriorate. This easily results in the toner having superior low-temperature fixability. Accordingly, a content of the monomer unit A2 in the vinyl polymer A is preferably 70.0% or less by mass, more preferably 60.0% or less by mass, even more preferably 50.0% or less by mass, still even more preferably 40.0% or less by mass.

In the case where the vinyl polymer A contains two or more types of monomer units A2, the monomer unit A2 content of the vinyl polymer A is the sum of their contents. One type of monomer unit A2 may be used alone, or two or more types thereof may be used in combination. One type of second polymerizable monomer may be used alone, or two or more types thereof may be used in combination.

Examples of the second polymerizable monomer include polymerizable monomers as follows:

cyano group-containing monomers, such as acrylonitrile and methacrylonitrile;

hydroxy group-containing monomers, such as 2-hydroxyethyl (meth)acrylate and 2-hydroxypropyl (meth)acrylate;

amide bond-containing monomers, such as acrylamide and monomers each formed by reaction of an amine having 1 to 30 carbon atoms with an ethylenically unsaturated bond-containing carboxylic acid having 3 to 30 carbon atoms, for example, acrylic acid, or methacrylic acid;

urea bond-containing monomers, such as monomers each formed by reaction of an amine having 3 to 22 carbon atoms, for example, a primary amine, e.g., n-butylamine, tert-butylamine, propylamine, or isopropylamine, a secondary amine, e.g., diethylamine, di-n-propylamine, or di-n-butylamine, aniline, or cyclohexylamine, with an ethylenically unsaturated bond-containing isocyanate having 3 to 30 carbon atoms; and carboxy group-containing monomers, such as methacrylic acid, acrylic acid, and 2-carboxyethyl (meth)acrylate.

Among these, monomers each containing a cyano group, a hydroxy group, an amide bond, or a urea bond can be used. The second polymerizable monomer can be a monomer containing at least one functional group selected from the group consisting of a cyano group, a hydroxy group, an amide bond, and a urea bond, and an ethylenically unsaturated bond.

Vinyl esters, such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate, and vinyl octylate, may also be used as the second polymerizable monomer. Vinyl esters are non-conjugated monomers and tend to maintain moderate reactivity with the first polymerizable monomer. Thus, the monomer units A1 seem to assemble easily in the vinyl polymer A. In other words, the crystalline moieties are easily formed by the assembly of the monomer units A1, thus easily resulting in the toner with superior low-temperature fixability.

The monomer unit A2 can be at least one monomer unit selected from the group consisting of a monomer unit represented by formula (A21) below and a monomer unit represented by formula (A22) below.

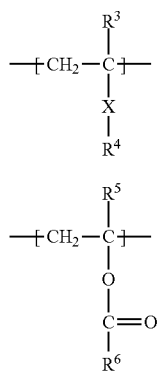

(A21)

(A22)

In formulae (A21) and (A22), X is a single bond or an alkylene group having 1 to 6 carbon atoms, $R^4$ is a cyano group (—C≡N), —C(=O)$NHR^7$ (where $R^7$ is a hydrogen atom or an alkyl group having 1 to 4 carbon atoms), a hydroxy group, —$COOR^8$ (where $R^8$ is an alkyl group having 1 to 6, preferably 1 to 4 carbon atoms or a hydroxyalkyl group having 1 to 6, preferably 1 to 4 carbon atoms), —$NHCOOR^9$ (where $R^9$ is an alkyl group having 1 to 4 carbon atoms), —NH—C(=O)—NH($R^{10}$)$_2$ (where each $R^{10}$ is independently a hydrogen atom or an alkyl group having 1 to 6, preferably 1 to 4 carbon atoms), —COO($CH_2$)$_2$ $NHCOOR^{11}$ (where $R^{11}$ is an alkyl group having 1 to 4 carbon atoms), or —COO($CH_2$)$_2$—NH—C(=O)—NH($R^{12}$)$_2$ (each $R^{12}$ is independently a hydrogen atom or an alkyl group having 1 to 6, preferably 1 to 4 carbon atoms), $R^6$ is an alkyl group having 1 to 4 carbon atoms, and $R^3$ and $R^5$ are each independently a hydrogen atom or $CH_3$.

Monomer Unit A3

The vinyl polymer A may contain a monomer unit A3 that does not fall under the monomer unit A1 or the monomer unit A2, to the extent that the monomer unit A1 content and the monomer unit A2 content are not impaired.

The monomer unit A3 can be incorporated as a monomer unit of a polymer by vinyl polymerization of a monomer corresponding to the monomer unit A3. Hereinafter, the monomer is referred to as a "third polymerizable monomer", and specific examples thereof will be described below.

As the third polymerizable monomer, among the polymerizable monomers listed in the section of the second polymerizable monomer above, a polymerizable monomer that does not satisfy the above formula (4) can be used.

The following polymerizable monomers that do not have a cyano group, an amide bond, a urethane bond, a hydroxy group, a urea bond, or a carboxy group can also be used.

Examples thereof include styrene and its derivatives, such as styrene and o-methylstyrene, and (meth)acrylates, such as n-butyl (meth)acrylate, tert-butyl (meth)acrylate, and 2-ethylhexyl (meth)acrylate.

When they satisfy formula (4) above, they can be used as the second polymerizable monomers.

Among these, the monomer unit A3 can be at least one monomer unit selected from the group consisting of a monomer unit represented by formula (A31) below and a monomer unit represented by formula (A32) below. These monomer units can be introduced by adding the corresponding monomers during a copolymerization reaction for the preparation of the vinyl polymer A. Among these, the monomer unit A3 can be the monomer unit represented by formula (A31) below in view of the low-temperature fixability, the high-temperature offset resistance, and the grindability of the resin component.

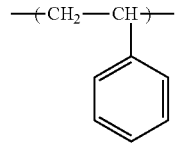

(A31)

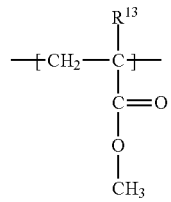

(A32)

In formula (A32), $R^{13}$ is H or $CH_3$. A content of the monomer unit A3 with respect to a content of the vinyl polymer A can be 1.0% or more by mass and 60.0% or less by mass.

When a content of the monomer unit A3 in the vinyl polymer A is 1.0% or more by mass, the elasticity of the toner is easily improved. This easily results in the toner having superior high-temperature offset resistance and durability. Accordingly, a content of the monomer unit A3 in the vinyl polymer A is preferably 1.0% or more by mass, more preferably 5.0% or more by mass. When a content of the monomer unit A3 in the vinyl polymer A is 60.0% or less by mass, the crystallinity of the vinyl polymer A is less likely to deteriorate. Accordingly, a content of the monomer unit A3 in the vinyl polymer A is preferably 60.0% or less by mass, more preferably 40.0% or less by mass, even more preferably 30.0% or less by mass.

One type of monomer unit A3 may be used alone, or two or more types thereof may be used in combination. One type of third polymerizable monomer may be used alone, or two or more types thereof may be used in combination. The vinyl polymer A may contain another monomer unit other than the monomer unit A1, A2, or A3.

Other Embodiments of Vinyl Polymer A

A content of the THF-soluble vinyl polymer A with respect to a content of the resin component can be 20.0% to 95.0% by mass. The fact that a content of the THF-soluble vinyl polymer A is 20.0% or more by mass indicates that a sufficient amount of THF-soluble vinyl polymer A is contained in the resin component. Thus, an appropriate elasticity of the toner is easily maintained, thereby easily resulting in the toner having superior low-temperature fixability. Accordingly, a content of the THF-soluble vinyl polymer A in the resin component is preferably 20.0% or more by mass, more preferably 30.0% or more by mass, even more preferably 40.0% or more by mass. The fact that a content of the THF-soluble vinyl polymer A in the resin component is 95.0% or less by mass does not easily make the toner elasticity insufficient. Accordingly, a content of the THF-soluble vinyl polymer A in the resin component is preferably 95.0% or less by mass, more preferably 80.0% or less by mass, even more preferably 70.0% or less by mass, still even more preferably 60.0% or less by mass.

The weight-average molecular weight (Mw) of the vinyl-based polymer A is preferably 10,000 to 200,000, more preferably 20,000 to 100,000, and even more preferably 40,000 to 80,000.

One type of vinyl polymer A may be used alone, or two or more types thereof may be used in combination.

Amorphous Resin P

The amorphous resin (amorphous resin P) used in the production of the resin component can contain carbon-carbon double bonds from the viewpoint of facilitating the cross-linking reaction with the vinyl polymer A. In addition, the amorphous resin P may be contained in the toner.

The weight-average molecular weight (Mw) of the amorphous resin P is preferably 2,000 to 40,000, more preferably 10,000 to 35,000, even more preferably 15,000 to 30,000.

One type of amorphous resin P may be used alone, or two or more types thereof may be used in combination.

Amorphous Polyester P

The amorphous resin P can be an amorphous polyester. Hereinafter, the amorphous polyester of the present disclosure is also referred to as an "amorphous polyester P". Polyester is a polycondensate of an alcohol component and a carboxylic acid component.

A method for producing the amorphous polyester P is not particularly limited. The condensation polymerization reaction of the alcohol component and the carboxylic acid component can be conducted to prepare the amorphous polyester P, which is a polycondensate of the corresponding alcohol and carboxylic acid components. One type of alcohol component may be used alone, or two or more types thereof may be used in combination. One type of carboxylic acid component may be used alone, or two or more types thereof may be used in combination.

The amorphous polyester P can be a polyester containing, as a constituent, at least one of an unsaturated carboxylic acid component and an unsaturated alcohol component as a component.

The amorphous polyester P can contain, in addition to the unsaturated carboxylic component or unsaturated alcohol component, a constituent having a polycondensed structure of a saturated alcohol component and/or a saturated carboxylic, acid component. One type of saturated alcohol component may be used alone, or two or more types thereof may be used in combination. One type of saturated carboxylic acid component may be used alone, or two or more types thereof may be used in combination.

The nonlinear amorphous polyester P can be produced, for example, by polycondensation of the unsaturated carboxylic acid component and/or the unsaturated alcohol component together with a tri- or higher-hydric polyol component that is a saturated alcohol component serving as an alcohol component. Similarly, the nonlinear amorphous polyester P can also be produced by polycondensation of the unsaturated carboxylic acid component and/or the unsaturated alcohol component together with a tri- or higher-valent carboxylic acid component.

In the process of the polycondensation reaction of the alcohol component and the carboxylic acid component, the polycondensation reaction is preferably performed in an inert gas atmosphere, such as a nitrogen gas atmosphere, at a reaction temperature of 150° C. or higher and 280° C. or lower, more preferably 160° C., or higher and 250° C. or lower, even more preferably 170° C. or higher and 235° C. or lower. When the polycondensation reaction is performed at a reaction temperature in the above range, the components can be sufficiently reacted. From the viewpoint of reliably performing the polycondensation reaction, the reaction time is preferably 30 minutes or more and 40 hours or less, more preferably 2 hours or more and 40 hours or less.

During the production of the amorphous polyester P (during the polycondensation reaction), an esterification catalyst can be used.

Examples of the esterification catalyst include tin-containing catalysts, such as dibutyltin oxide; antimony dioxide; titanium-containing catalysts, such as titanium alkoxide, potassium titanium oxalate, titanium terephthalate, titanium terephthalate alkoxide, titanium dihydroxybis(triethanolaminate), titanium monohydroxytris(triethanolaminate), titanyl bis(triethanolaminate), intramolecular polycondensates thereof, titanium tributoxyterephthalate, titanium triisopropoxyterephthalate, and titanium diisopiopoxyditerephthalate; zirconium-containing catalysts, such as zirconyl acetate; and zinc acetate.

Among these, the titanium-containing catalysts can be used. To improve the reaction rate at the end of the reaction, a reduction in pressure is also effective.

A stabilizer may also be added for the purpose of providing good polymerization stability. Examples of the stabilizer include hydroquinone, methythydroquinone, and hindered phenolic compounds.

Examples of the alcohol component of the amorphous polyester P include unsaturated alcohol components and saturated alcohol components. Among these, an alcohol having 1 to 30 carbon atoms can be used. Aliphatic alcohol components having 1 to 6 carbon atoms can be used for the alcohol component of the amorphous polyester P.

Among the above aliphatic alcohol components having 1 to 6 carbon atoms, a polyhydric alcohol having 2 to 6 carbon atoms can be used in view of the low-temperature fixability, the high-temperature offset resistance, and the developing performance. An alkylene glycol having 2 to 6 carbon atoms can be used. Ethylene glycol can be used. That is, the amorphous polyester P can have a polycondensed structure of a polyhydric alcohol having 2 to 6 carbon atoms. The amorphous polyester P can have a polycondensed structure of an alkylene glycol having 2 to 6 carbon atoms. The amorphous polyester P can have a polycondensed structure of ethylene glycol. Examples of the polyhydric alcohol having 2 to 6 carbon atoms include ethylene glycol, propylene glycol, pentaerythritol, and neopentyl glycol. When the amorphous polyester P has such a structure, $SP_P$ is appropriately controlled to easily satisfy formulae (5), (6), and (7). This easily results in the toner having superior developing performance.

A content of the polycondensed structure of an aliphatic alcohol component having 1 to 6 carbon atoms with respect to a content of the amorphous polyester P can be 10.0% or more by mass. When the content of the polycondensed structure is 10.0% or more by mass, $SP_P$ is appropriately controlled to easily satisfy formulae (5), (6), and (7) above. Accordingly, the content of the polycondensed structure is preferably 10.0% or more by mass, more preferably 20.0% or more by mass, even more preferably 30.0% or more by mass.

A content of the polycondensed structure of the aliphatic alcohol component having 1 to 6 carbon atoms with respect to a total content of the polycondensed structure of alcohol component contained in the amorphous polyester P is preferably 15.0% or more by mass, more preferably 25.0% or more by mass, even more preferably 40.0% or more by mass.

Examples of the aliphatic alcohol component having 1 to 6 carbon atoms include, as unsaturated aliphatic alcohols, unsaturated monools having 3 to 6 carbon atoms, such as 2-propen-1-ol, unsaturated dials having 4 to 6 carbon atoms; and, as saturated aliphatic alcohols, alkanols having 1 to 6 carbon atoms, such as methanol, ethanol, and isopropanol, alkylene glycols having 2 to 6 carbon atoms, such as ethylene glycol, 1,2-propylene glycol, 1,3-propylene glycol, 1,4-butanediol, neopentyl glycol, and 1,6-hexanediol, and tri- to octa-hydric or higher-hydric polyols.

Examples of the carboxylic acid component of the amorphous polyester P include unsaturated carboxylic acids and saturated carboxylic acids. Examples of unsaturated carboxylic acids include unsaturated monocarboxylic acids, unsaturated dicarboxylic acids, unsaturated polycarboxylic acids, and anhydrides and lower alkyl esters of these acids.

Examples of unsaturated monocarboxylic acids include unsaturated monocarboxylic acids having 3 to 80 carbon atoms, such as acrylic acid, methacrylic acid, propiolic acid, 2-butenoic acid, crotonic acid, isocrotonic acid, 3-butenoic acid, angelic acid, tiglic acid, 4-pentenoic acid, 2-ethyl-2-butenoic acid, 10-undecenoic acid, 2,4-hexadienoic acid, myristoleic acid, palmitoleic acid, sapienic acid, oleic acid, elaidic acid, vaccenic acid, gadoleic acid, erucic acid, and nervonic acid.

Examples of unsaturated dicarboxylic acids include unsaturated dicarboxylic acids having 4 to 50 carbon atoms, such as alkenylsuccinic acid, e.g., dodecenylsuccinic acid, maleic acid, fumaric acid, citraconic acid, mesaconic acid, itaconic acid, and glutaconic acid.

Examples of unsaturated polycarboxylic acids include vinyl polymers of unsaturated carboxylic acids having a number-average molecular weight (Mn) of 450 to 10,000 by gel permeation chromatography (GPC).

Among the above unsaturated carboxylic acids, acrylic acid, methacrylic acid, alkenylsuccinic acid, such as dodecenylsuccinic acid, maleic acid, fumaric acid, and combinations thereof can be used from the viewpoint of achieving both good low-temperature fixability and good high-temperature offset resistance. Acrylic acid, methacrylic acid, maleic acid, fumaric acid, and combinations thereof can be used. The unsaturated carboxylic acids may also be anhydrides or lower alkyl esters of these acids.

Examples of the above saturated carboxylic acids include aliphatic monocarboxylic acids having 2 to 50 carbon atoms, such as stearic acid and behenic acid, aromatic monocarboxylic acids having 7 to 37 carbon atoms, such as benzoic acid, aliphatic dicarboxylic acids having 2 to 50 carbon atoms, such as oxalic acid, malonic acid, succinic acid, adipic acid, lepargylic acid, and sebacic acid, aromatic dicarboxylic acids having 8 to 86 carbon atoms, such as phthalic acid, isophthalic acid, terephthalic acid, and naphthalenedicarboxylic acid, aromatic polycarboxylic acids having 9 to 20 carbon atoms, such as trimellitic acid and pyromellitic acid, and aliphatic dicarboxylic acids having 6 to 36 carbon atoms, such as hexanetricarboxylic acid.

The above saturated carboxylic acids may also be anhydrides and lower alkyl (1 to 4 carbon atoms) esters, such as methyl esters, ethyl esters, and isopropyl esters, of these carboxylic acids.

Among the above saturated carboxylic acids, aromatic carboxylic acids having 7 to 87 carbon atoms, alkanedicarboxylic acids having 2 to 50 carbon atoms, aromatic dicarboxylic acids having 8 to 20 carbon atoms, and aromatic polycarboxylic acids having 9 to 20 carbon atoms can be used. The use of the above saturated carboxylic acid easily results in the toner having superior low-temperature fixability and high-temperature offset resistance. In view of the low-temperature fixability, the high-temperature offset resistance, and the chargeability, benzoic acid, adipic acid, alkylsuccinic acid, terephthalic acid, isophthalic acid, trimellitic acid, pyromellitic acid, and combinations thereof can be used. Adipic acid, terephthalic acid, trimellitic acid, and combinations thereof can be used. Anhydrides and lower alkyl esters of these acids may also be used.

Amount of Carbon-Carbon Double Bond Contained

The amount of carbon-carbon double bond contained in the amorphous resin P (double bond equivalent) is preferably 0.02 mmol/g or more and 0.80 mmol/g or less, more preferably 0.20 mmol/g or more and 0.70 mmol/g or less.

In the above range, the cross-linking reaction between the crystalline resin and the amorphous resin tends to proceed appropriately, and the THF-insoluble component that satisfies formulae (1) and (2) above can be easily contained in the toner. A resin in which the crystalline resin and the amorphous resin are cross-lined is easily contained, so that the aggregation of the domains is easily inhibited. This easily results in the toner having superior developing performance.

Weight-Average Molecular Weight (Mw) of Amorphous Polyester P

The weight-average molecular weight (Mw) of the amorphous polyester P is preferably 2,000 or more and 40,000 or less, more preferably 10,000 or more and 35,000 or less, even more preferably 15,000 or more and 30,000 or less. When the weight-average molecular weight (Mw) of the amorphous polyester P is in the above range, the size of the domains in the domain-matrix structure is not excessively large, and coarse domains are less likely to be contained. One type of amorphous polyester P may be used alone, or two or more types thereof may be used in combination.

Cross-Linking Reaction Between Crystalline Resin A and Amorphous Resin P

The THF-insoluble component can contain the resin formed by the cross-linking reaction of the crystalline resin A and the amorphous resin P. That is, the THF-insoluble component can contain the resin in which the crystalline resin and the amorphous resin are bonded together. The THF-insoluble component can have a structure in which the crystalline resin and the amorphous resin are at least partially bonded together. Hereinafter, the resin in which the crystalline resin A and the amorphous resin P are bonded together will be referred to as a "cross-linked resin L".

Examples of a method for bonding the crystalline resin A and the amorphous resin P include a method in which a radical initiator is used for a mixture of the crystalline resin A and the amorphous resin P that have been dissolved or melted, and a method in which a crosslinking agent containing a functional group that reacts with both the crystalline resin A and the amorphous resin P is used.

Non-limiting examples of the radical initiator used in the cross-linking method with the radical initiator include inorganic peroxides, organic peroxides, and azo compounds. These radical reaction initiators may also be used in combination.

When both the crystalline resin A and the amorphous resin P have carbon-carbon double bonds, the carbon-carbon double bonds are seemingly cleaved by the radical initiator, resulting in cross-linking of the crystalline resin A and the amorphous resin P.

Examples of the crosslinking agent containing a functional group that reacts with both the crystalline resin A and the amorphous resin P include, but are not particularly limited to, epoxy group-containing crosslinking agents, isocyanate group-containing crosslinking agents, oxazoline group-containing crosslinking agents, carbodiimide group-containing crosslinking agents, hydrazide group-containing crosslinking agents, and aziridine group-containing crosslinking agents. In the crosslinking method with a crosslinking agent containing a functional group that reacts with both the crystalline resin A and the amorphous resin P, both the crystalline resin A and the amorphous resin P need to contain functional groups that react with the crosslinking agent.

The resin in which the crystalline resin A and the amorphous resin P are cross-lined by the above method and are at least partially bonded together, namely, the cross-linked resin L in which the crystalline resin A and the amorphous resin P are cross-lined, can be used for the production of the toner. In the case of producing the toner by a melt-kneading method, a raw-material mixture containing the crystalline resin A and the amorphous resin P can be melt-kneaded in the presence of the above radical initiator or crosslinking agent to produce the toner particles containing the resin in which the crystalline resin A and the amorphous resin P are bonded together.

The cross-linked resin L content can be controlled by the compositions and molecular weights of the crystalline resin A and the amorphous resin P and the degree of bonding between the crystalline resin A and the amorphous resin P in the production of the resin component. The degree of bonding can be controlled, for example, by the type and amount of the above radical reaction initiator added and the amount of carbon-carbon double bond contained in the amorphous resin P in the production of the resin component.

For example, the cross-linked resin L can be a resin produced as follows: a radical reaction initiator is added while melt-kneading an amorphous polyester resin, serving as the amorphous resin P, containing a carbon-carbon double bond and a vinyl polymer A serving as the crystalline resin A to perform the cross-linking reaction.

When the cross-linked resin L is produced with the crystalline resin A and the amorphous resin P, the crystalline resin A and the amorphous resin P are at least partially bonded together to form the cross-linked resin L.

Examples of the radical reaction initiator used for the above cross-linking reaction include, but are not particularly limited to, inorganic peroxides, organic peroxides, and azo compounds. These radical reaction initiators may also be used in combination.

Examples of inorganic peroxides include, but are not particularly limited to, hydrogen peroxide, ammonium persulfate, potassium persulfate, and sodium persulfate.

Examples of organic peroxides include, but are not particularly limited to, benzoyl peroxide, di-tert-butyl peroxide, tert-butylcumyl peroxide, dicumyl peroxide, α,α-bis(tert-butylperoxy)diisopropylbenzene, 2,5-dimethyl-2,5-bis(ten-butylperoxy)hexane, di-tert-hexyl peroxide, 2,5-dimethyl-2,5-di-tert-butyl peroxyhexanoate, acetyl peroxide, isobutyl peroxide, octanoyl peroxide, decanoyl peroxide, lauroyl peroxide, 3,3,5-trimethylhexanoyl peroxide, m-toluoyl peroxide, tert-butyl peroxyisobutyrate, tert-butyl peroxyneodecanoate, cumyl peroxyneodecanoate, tert-butyl peroxy-2-ethylhexanoate, tert-butyl peroxy-3,5,5-trimethylhexanoate, tert-butyl peroxylaurate, tert-butyl peroxybenzoatc, tert-butyl peroxyisopropyl monocarbonate, and tert-butyl peroxyacetate.

Examples of azo compounds and diazo compounds include, but are not particularly limited to, 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethytvaleronitrile, and azobisisobutyronitrile.

Among these, organic peroxides can be used because they have high initiator efficiency and do not produce toxic byproducts, such as cyanide compounds. A reaction initiator having a high hydrogen abstraction ability can be used because the cross-linking reaction proceeds efficiently and the amount of the initiator is small. Examples thereof include radical reaction initiators, such as tert-butylperoxy isopropyl monocarbonate, benzoyl peroxide, di-tert-butyl peroxide, tert-butyl peroxide, dicumyl peroxide, α,α-bis(tert-butyl peroxy)diisopropylbenzene, 2,5-dimethyl-2,5-bis(tert-butylperoxy)hexane, and di-tert-hexyl peroxide.

The mixing ratio when the vinyl polymer A and the amorphous polyester P are mixed (the mass of the polymer A used in the mixing/the mass of the amorphous polyester used in the mixing) is preferably from (40/60) to (95/5), more preferably from (50/50) to (80/20). In this range, the cross-linking reaction between the vinyl polymer A and the amorphous polyester P tends to proceed appropriately, thereby easily resulting in the toner having superior low-temperature fixability, high-temperature offset resistance, and developing performance. When the above mixing ratio is outside the range of (50/50) to (80/20), the amount of radical initiator added can be 2.0 parts or more by mass based on the sum total of 100.0 parts by mass of the vinyl polymer A and the amorphous polyester P used in the mixing. This is because when the amount of radical initiator added is less than 2.0 parts by mass, the cross-linking reaction between the vinyl polymer A and the amorphous polyester P does not proceed sufficiently; and formulae (1) and (2) above are not satisfied, in some cases.

Two-Component Developer

The toner can be used as a single-component developer. The toner may also be a two-component developer containing the toner according to an embodiment of the present disclosure and a magnetic carrier.

Examples of the magnetic carrier include iron powder with an oxidized surface, unoxidized iron powder, particles of metals, such as iron, lithium, calcium, magnesium, nickel, copper, zinc, cobalt, manganese, chromium, and rare-earth metals, alloy particles thereof, oxide particles thereof, magnetic materials, such as ferrite, and magnetic material-dispersed resin carriers, what is called resin carriers, each containing a magnetic material and a binder resin that holds the magnetic material in a dispersed state.

When the toner is mixed with a magnetic carrier and used as a two-component developer, the amount of carrier contained is preferably 2% or more by mass and 15% or less by mass, more preferably 4% or more by mass and 13% or less by mass, based on the total mass of the two-component developer. In the above range, good results are usually provided.

Various Additives

The toner may contain one or more additives selected from colorants, release agents, charge control agents, fluidizers, and other additives, as needed, in addition to the resin component (binder resin). Materials other than the resin component used in the toner will be described below.

Release Agent

The toner may contain a release agent in order to provide good releasability during fixing. Examples of the release agent include polyolefin copolymers and aliphatic hydrocarbon waxes, such as polyolefin waxes, microcrystalline waxes, paraffin waxes, Fischer-Tropsch waxes, and ester waxes.

The release agent can have a molecular weight of 1,000 or more. The release agent having molecular weight of 1,000 or more seems to be less compatible with the crystalline moieties of the vinyl polymer A. This allows the release agent to easily seep out onto the surfaces of the toner particles during fixing, thereby easily improving releasability. The crystalline moieties are less compatible with the release agent, and thus the crystallinity of the crystalline moieties is not easily impaired.

The molecular weight of the release agent refers to the molecular weight (Mp) at the peak maximum measured by gel permeation chromatography (GPC). The measurement method will be described below.

The release agent can have a molecular weight of 1,500 or more. The upper limit of the molecular weight of the release agent is, but not particularly limited to, preferably 10,000 or less, more preferably 5,000 or less, from the viewpoint of achieving good releasability.

The release agent is not particularly limited as long as it has a molecular weight of 1,000 or more.

Examples thereof include aliphatic hydrocarbon waxes, such as low-molecular-weight polyethylene, low-molecular-weight polypropylene, low-molecular-weight olefin copolymers, and Fischer-Tropsch waxes, and oxidized products thereof, and acid addition products thereof.

Ester waxes mainly composed of fatty esters can also be used. In view of molecular weight, the ester waxes are preferably tri- or higher-functional ester waxes, more preferably tetra- or higher-functional ester waxes.

The tri- or higher-functional ester waxes are produced, for example, by condensation of tri- or higher-functional acids with linear long-chain saturated alcohols, or by condensation of tri- or higher-functional alcohols with linear long-chain saturated fatty acids.

Non-limiting examples of tri- or higher-functional alcohols that can be used for the ester waxes are given below. These ester waxes can also be used in combination as a mixture.

Examples thereof include glycerol, trimethylolpropane, erythritol, pentaerythritol, and sorbitol. Examples of condensation products thereof include condensation products of glycerol, i.e., polyglycerols, such as diglycerol, triglycerol, tetraglycerol, hexaglycerol, and decaglycerol; condensation products of trimethylolpropane, such as di(trimethylolpropane) and tris(trimethylolpropane); and condensation products of pentaerythritol, such as di(pentaerythritol) and tris(pentaerythritol).

Among these, compounds having branched structures can be used. Pentaerythritol and dipentaerythritol can be used, in particular, dipentaerythritol can be used.

The linear long-chain saturated fatty acids represented by the following general formula can be used: $C_nH_{2n+1}COOH$ where n is 5 or more and 28 or less.

Non-limiting examples of the linear long-chain saturated fatty acids include caproic acid, caprylic acid, octyl acid, nonyl acid, decanoic acid, dodecanoic acid, lauric acid, tridecanoic acid, myristic acid, palmitic acid, stearic acid, and behenic acid. Myristic acid, palmitic acid, stearic acid, and behenic acid can be used in terms of the melting points of the waxes. These can also be used in combination as a mixture.

Non-limiting examples of the tri- or higher-functional acids include trimellitic acid and butanetetracarboxylic acid. These can also be used in combination as a mixture.

The linear long-chain saturated alcohols represented by the following general formula can be used: $CH_nH_{2n+1}OH$ where n is 5 or more and 28 or less.

Non-limiting examples of the linear long-chain saturated alcohols include caprylic alcohol, lauryl alcohol, myristyl alcohol, palmityl alcohol, stearyl alcohol, and behenyl alcohol. Myristyl alcohol, palmityl alcohol, stearyl alcohol, and behenyl alcohol can be used in terms of the melting points of the waxes. These can also be used in combination as a mixture.

As the release agent, a release agent having a softening point of 50° C. or higher and 170° C. or lower measured with a flow tester can be used. Examples thereof include polyolefin waxes, natural waxes, aliphatic alcohols having 30 to 50 carbon atoms, fatty acids having 30 to 50 carbon atoms, and mixtures thereof.

Examples of polyolefin waxes include (co)polymers of olefins, such as ethylene, propylene, 1-butene, isobutylene, 1-hexene, 1-dodecene, 1-octadecene, and mixtures thereof, including those obtained by (co)polymerization and thermally degraded polyolefins; oxidized olefin (co)polymers with oxygen and/or ozone; maleic acid-modified olefin (co)polymers, such as olefin (co)polymers modified with maleic acid and its derivatives, e.g., maleic anhydride, monomethyl maleate, monoethyl maleate, and monobutyl maleate; copolymers of olefins, unsaturated carboxylic acids, such as (meth)acrylic acid, itaconic acid, and maleic anhydride, and/or unsaturated carboxylic acid alkyl esters, such as alkyl (meth)acrylates (where the alkyl group has 1 to 18 carbon atoms) and alkyl maleates (where the alkyl group has 1 to 18 carbon atoms); and sazol wax.

Examples of natural waxes include carnauba wax, montan wax, paraffin wax, and rice wax. Examples of aliphatic alcohols having 30 to 50 carbon atoms include triacontanol. Examples of fatty acids having 30 to 50 carbon atoms include triacontanoic acid.

The release agent can contain an aliphatic hydrocarbon wax. The release agent can be an aliphatic hydrocarbon wax. The aliphatic hydrocarbon wax has low polarity and thus tends to seep out from the polymer A during fixing.

A content of a release agent in the toner is preferably 1.0% to 30.0% by mass. A release agent content of 1.0% or more by mass can result in the toner having good releasability. Accordingly, a content of a release agent is preferably 1.0% or more by mass, more preferably 2.0% or more by mass. A release agent content of 30.0% or less by mass is less likely to lead to exposure of the release agent on the surfaces of the toner particles. Accordingly, a content of a release agent is preferably 30.0% or less by mass, more preferably 25.0% or less by mass.

The release agent can have a melting point of 80° C. or higher and 120° C. or lower. A melting point of 80° C. or higher is less likely to lead to exposure of the release agent on the surfaces of the toner particles. Accordingly, the release agent preferably has a melting point of 80° C. or higher, more preferably 85° C. or higher. A melting point of 120° C. or lower results in the appropriate melting of the release agent during fixing. This easily results in the toner having superior low-temperature fixability and high-temperature offset resistance. Accordingly, the release agent preferably has a melting point of 120° C. or lower, more preferably 110° C. or lower.

One type of release agent may be used alone, or two or more types thereof may be used in combination.

Magnetic Material

Examples of magnetic materials are described below.

Examples thereof include iron oxides, such as magnetite, hematite, and ferrite; metals, such as iron, cobalt, and nickel; alloys of the above metals with metals, such as aluminum, cobalt, copper, lead, magnesium, tin, zinc, antimony, bismuth, calcium, manganese, titanium, tungsten, and vanadium; and mixtures thereof.

Colorant

Examples of colorants are described below.

Examples of black colorants include carbon black; black colorants prepared with yellow colorants, magenta colorants, and cyan colorants. As the colorant, a pigment may be used alone, or a dye and a pigment may be used in combination. In view of the image quality of full-color images, a dye and a pigment can be used in combination.

Examples of pigments for magenta toners include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Red 1, 2, 10, 13, 15, 23, 29, and 35.

Examples of dyes for magenta toners include oil-soluble dyes, such as C.I. Solvent Red 1, 3, 23, 24, 25, 27, 30, 49, 81, 82, 83, 84, 100, 109, and 121, C.I. Disperse Red 9, C.I. Solvent Violet 8, 13, 14, 21, and 27, and C.I. Disperse Violet 1; and basic dyes, such as C.I. Basic Red 1, 2, 9, 12, 13, 14, 15, 17, 18, 22, 23, 24, 27, 29, 32, 34, 35, 36, 37, 38, 39, and 40, and C.I. Basic Violet 1, 3, 7, 10, 14, 15, 21, 25, 26, 27, and 28.

Examples of pigments for cyan toners include C.I. Pigment Blue 2, 3, 15:2, 15:3, 15:4, 16, and 17; C.I. Vat Blue 6; C.I. Acid Blue 45; and copper phthalocyanine pigments each having a phthalocyanine framework substituted with one to five phthalimidomethyl groups.

An example of dyes for cyan toners is C.I. Solvent Blue 70. Examples of pigments for yellow toners include C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20.

An example of dyes for yellow toners is C.I. Solvent Yellow 162.

These colorants may be used alone, in combination as a mixture, or in the form of solid solutions.

Charge Control Agent

A charge control agent may be contained in order to stabilize the chargeability of the toner. The charge control agent can be an organometallic complex or a chelate compound. Examples thereof include monoazo metal complexes, metal acetylacetonate complexes, metal complexes of aromatic hydroxycarboxylic acids, metal complexes of aromatic dicarboxylic acids, and metal salts thereof. The charge control agent may be internally or externally added to the toner.

Fine Inorganic Particles

The toner may contain fine inorganic particles, as needed. The fine inorganic particles may be internally added to the toner particles or may be mixed with the toner as an external additive. Examples of inorganic particles include fine particles, such as fine silica particles, fine titanium oxide particles, fine alumina particles, and fine complex oxide particles thereof. Among the inorganic particles, fine silica particles and fine titanium oxide particles can be used to improve flowability and charge uniformity.

The inorganic particles can be hydrophobized with a hydrophobizing agent, such as a silane compound, silicone oil, or a mixture thereof.

The amount of external additive can be 0.1 parts or more by mass and 10.0 parts or less by mass based on 100 parts by mass of the toner particles. The toner particles and the external additive can be mixed using a known mixer, such as a Henschel mixer.

Fluidizer

A fluidizer may be contained in order to adjust the flowability of the toner. Examples of the fluidizer include colloidal silica, an alumina powder, a titanium oxide powder, and a calcium carbonate powder.

Method for Producing Toner

A method for producing the toner according to an embodiment of the present disclosure is not particularly limited. Examples of the production method that can be employed include a pulverization method, a suspension polymerization method, a dissolution suspension method, an emulsion aggregation method, and a dispersion polymerization method. In view of developing performance and high-temperature offset resistance, the pulverization method, which can further improve the dispersibility, can be employed. That is, the method for producing the toner according to an embodiment of the present disclosure can include the steps of melt-kneading a mixture containing a crystalline resin, an amorphous resin, and a radical initiator to provide a kneaded material, and pulverizing the kneaded material to provide a pulverized product.

In view of the developing performance, the high-temperature offset resistance, and the low-temperature fixability as described above, the method for producing the toner according to an embodiment of the present disclosure can include the steps of melt-kneading a mixture of a crystallizable vinyl polymer A, an amorphous resin P containing a carbon-carbon double bond, and a radical initiator to provide a kneaded material, and pulverizing the kneaded material to provide a pulverized product, in which the vinyl polymer A contains a monomer unit A1 represented by formula (A) above, the vinyl polymer A further contains a monomer unit A2, when the SP value of the vinyl polymer A is defined as $SP_A$ $(J/cm^3)^{0.5}$, when the SP value of the amorphous resin P is defined as $SP_P$ $(J/cm^3)^{0.5}$, when the SP value of the monomer unit A1 is defined as $SP_{A1}$ $(J/cm^3)^{0.5}$, and when the SP value of the monomer unit A2 is defined as $SP_{A2}$ $(J/cm^3)^{0.5}$, $SP_{A1}$ and $SP_{A2}$ satisfy formula (4) above, $SP_A$ and $SP_P$ satisfy formula (5) above, and $SP_{A2}$, $SP_A$, and $SP_P$ satisfy formula (6) above.

The toner is produced by the pulverization method as described below. The toner particles are prepared by the following steps.

(i) Resin components of the toner and, if necessary, a colorant, a magnetic material, a wax, and other additives are sufficiently mixed together with a mixer, such as a Henschel mixer or a ball mill.

(ii) The resulting mixture is melt-kneaded with a thermal kneader, such as a twin-screw extruder, a heating roll, a kneader, or an extruder, to allow the resins to be compatible with each other.

(iii) The resulting mixture is cooled to solidify, pulverized, and classified.

To control the shape and surface properties of the toner particles, it is possible to include a surface treatment step of passing the toner particles through a surface treatment device that continuously applies a mechanical impact force to the toner particles that have been subjected to the pulverization and the classification. The surface profile of the toner particles and the adhesive strength of the toner particles can be controlled by controlling the treatment time in the surface treatment step.

If necessary, a desired external additive can be sufficiently mixed with the resulting toner particles using a mixer, such as a Henschel mixer, to produce the toner.

Examples of the mixer include Henschel mixer (available from Nippon Coke &. Engineering Co., Ltd.); Super Mixer (available from Kawata Mfg. Co., Ltd); Ribocone (available from Okawara Mfg. Co., Ltd.); Nauta Mixer, Turbulizer, and Cyclomix (available from Hosokawa Micron Corporation); Spiral Pin Mixer (available from Pacific Machinery & Engineering Co., Ltd.); and Lödige Mixer (available from Matsubo Corporation).

Examples of the kneader include KRC Kneader (available from Kurimoto Ltd.); Buss Ko-Kneader (available from Buss AG); TEM Extruder (available from Toshiba Machine Co., Ltd.); TEX Twin-Screw Extruder (available from The Japan Steel Works, Ltd.); PCM Extruder (available from Ikegai Corp.); three-roll mills, mixing roll mills, and kneaders (available from Inoue Mfg., Inc.); Kneadex (available from Mitsui Mining Co., Ltd.); MS Type Pressurized Kneader and Kneader-Ruder (available from Nihon Spindle Manufacturing Co., Ltd.); and Banbury mixer (available from Kobe Steel, Ltd).

Examples of the pulverizer include Counter Jet Mill, Micron Jet, and Innomizer (available from Hosokawa Micron Corporation); IDS Mill and PJM Jet Pulverizer (available from Nippon Pneumatic Mfg. Co., Ltd.); Cross Jet Mill (available from Kurimoto Ltd.); Ulmax (available from Nisso Engineering Co., Ltd.); SK-Jet-O-Mill (available from Seishin Enterprise Co., Ltd.); Kryptron (available from Kawasaki Heavy Industries, Ltd.); Turbo Mill (available from Turbo Kogyo Co., Ltd.); and Super Doter (available from Nisshin Engineering Inc).

Examples of the classifier include Classiel, Micron Classifier, and Speidc Classifier (available from Seishin Enterprise Co., Ltd.); Turbo Classifier (available from Nisshin Engineering Inc.); Micron Separator, Turboplex (ATP), and TSP Separator (available from Hosokawa Micron Corporation); Elbow-Jet (available from Nittetsu Mining Co., Ltd.); Dispersion Separator (available from Nippon Pneumatic Mfg. Co., Ltd.); and YM Micro Cut (available from Yaskawa & Co., Ltd).

Examples of a surface treatment device include Faculty (available from Hosokawa Micron Corporation), Mechano Fusion (available from Hosokawa Micron Corporation), Nobilta (available from Hosokawa Micron Corporation), Hybridizer (available from Nara Machinery Co., Ltd.), Innomizer (available from Hosokawa Micron Corporation), Theta Composer (available from Tokuju Corporation), and Mechano Mill (available from Okada Seiko Co., Ltd.).

Examples of a screening machine used to screen coarse particles include Ultrasonic (available from Koei Sangyo Co., Ltd.); Resonasieve and Gyro-Sifter (available from Tokuju Corporation); Vibrasonic System (available from Dalton Corporation); Soniclean (available from Sintokogio, Ltd.); Turbo Screener (available from Turbo Kogyo Co., Ltd.); Micro Sifter (available from Makino Mfg. Co., Ltd.); and circular vibration sieves.

Various Measurement Methods

Various measurement methods and so forth will be described below. Method for Observing Cross Section of Toner Particles and for Measuring long diameter and Number of Domains with Transmission Electron Microscope (TEM)

The domain-matrix structure is observed after ruthenium staining is performed on cross sections of the toner particles.

The toner is spread on a cover glass (square cover glass No. 1, Matsunami Glass Ind., Ltd.) in a single layer. An Os film (5 nm) and a naphthalene film (20 nm) are formed on the toner as protective films with an osmium plasma coater (Filgen Inc., OPC80T). A PTFE tube (Ø1.5 mm×Ø3 mm×3 mm) is filled with a D800 photocurable resin (JEOL Ltd). The above cover glass is gently placed on top of the tube in such a manner that the toner is in contact with the D800 photocurable resin. The resin is cured by irradiation with light in this state, and then the cover glass and the tube are removed. This forms a cylindrical resin with the toner particles embedded in the top surface. The top surface of the cylindrical resin is cut by the length of the radius of the toner particles (4.0 μm when the weight-average particle size (D4) is 8.0 μm) at a cutting speed of 0.6 mm/s with an ultrasonic ultramicrotome (Leica microsystems, UC7) to expose the cross sections of the toner particles. The resin is cut to a thickness of 250 nm to prepare a thin sample of the cross sections of the toner particles. The cross section at the center of the toner particle can be obtained by cutting in this way.

The resulting thin sample is stained with a vacuum electron staining apparatus (Filgen Inc., VSC4R1H) for 15 minutes in an atmosphere of $RuO_4$ gas at a pressure of 500 Pa, and STEM observation is performed with a TEM (JEOL Ltd., JEM-2800).

The probe size in STEM observation is 1 nm, and the image size is 1,024×1,024 pixels.

The resulting bright-field images are binarized using image-processing software Image-Pro Plus (Media Cybernetics Inc). This binarization process is such that when a change in luminance from black to white is defined as 0 to 255 gray levels, portions having a gray level of 127 or less are black and portions having a gray level of 128 or more are white.

In the cross-sectional observation of the toner particles, crystalline resin-containing portions appear black when the above binarization process is performed, and amorphous resin-containing portions appear white when the above binarization process is performed.

From the binarized images obtained by the STEM observation, whether the domain-matrix structure is observed in the cross section of each of the toner particles is determined. Additionally, whether the domains contain the crystalline or amorphous resin and whether the matrix contains the crystalline or amorphous resin are determined.

The toner particles as targets for observation to measure the major diameter of domains are selected as described below. From the cross-sectional images of the toner particles, the cross-sectional area of each toner particle is determined, and the diameter (equivalent circular diameter) of a circle having an area equal to the cross-sectional area is determined. The toner particles in which the absolute value of the difference between the equivalent circular diameter and the weight-average particle size (D4) of the toner particles is 1.0 μm or less are targeted for observation. Cross-sectional observation of the toner particles is performed until the number of the toner particles in which the absolute value of the difference between the diameter of the circle having an area equal to the cross-sectional area of each of the toner particles and the weight-average particle size (D4) of the toner particles is 1.0 μm or less is 100.

The major diameters of all the domains observed at the cross sections of the toner particles selected as the targets for observation are measured. The domains are observed as white portions when composed of the amorphous resin. Among these, the domain having the longest diameter is selected. The longest diameter of the domain is referred to as the major diameter of the domain. This measurement is performed for 100 selected toner particles. The number of the toner particles having a major diameter of 1.0 μm or less is counted.

Principle of Ruthenium Staining

When the ruthenium staining is performed on the cross-sections of the toner particles, the crystalline resin component is stained with ruthenium, compared with the amorphous resin component. This results in a clearer contrast and facilitates the observation of the cross sections of the toner particles. This is because $RuO_4$ has a strong oxidizing power and oxidizes the long-chain alkyl and alkylenes groups that enhance the crystallinity. Thus, the crystalline resin component is stained more intensely than the amorphous resin component.

A higher crystallinity of the resin component results in a larger number of ruthenium atoms present. The presence of a larger number of ruthenium atoms interferes more with the transmission of electron beams. Thus, the resin component having higher crystallinity is observed to be more intensely stained on the electron microscopic image. In contrast, the amorphous resin component is observed to be weakly stained or unstained. This indicates that the portions that are intensely stained are the crystalline resin-containing portions, and the portions that are weakly stained or not stained are the amorphous resin-containing portions.

Method for Analyzing Matrix and Domain in Cross-Sectional Observation of Toner Particles First, a thin strip is prepared as a reference sample for the amount present.

The crystalline resin A is sufficiently dispersed in the visible light-curable resin (Aronix LCR series, D800), and then the mixture is cured by irradiation with light having a short wavelength. The resulting cured product is cut using an ultramicrotome equipped with a diamond knife to prepare a 250-nm-thick thin sample. A thin sample of the amorphous resin P is similarly prepared.

The crystalline resin A and the amorphous resin P are mixed together in ratios by mass of 0/100, 30/70, 70/30, and 100/0, Each of the resulting mixtures is melt-kneaded to prepare a kneaded material. These are also dispersed in the visible light-curable resin in the same way, cured, and then cut to prepare thin samples.

The cross sections of these reference samples are observed with a transmission electron microscope (JEOL Ltd., JEM-2800 electron microscope, TEM-EDX), and elemental mapping is performed using EDX. The elements mapped are carbon, oxygen, and nitrogen.

The mapping conditions are given below.

Acceleration voltage: 200 kV
Electron beam irradiation size: 1.5 nm
Live time limit: 600 seconds
Dead time: 20 to 30 seconds
Mapping resolution: 256×256

Based on the (average) spectral intensity of each element (in a 10 nm square area), (intensity of oxygen element/intensity of carbon element) and (intensity of nitrogen element/intensity of carbon element) are calculated. Then, a calibration curve is formed for the ratios by mass of the crystalline resin A and the amorphous resin P. When the monomer unit of the crystalline resin A contains a nitrogen atom, the calibration curve of (intensity of nitrogen element/intensity of carbon element) is used for quantification.

Next, the toner particle sample is analyzed.

The toner particles are sufficiently dispersed in visible light-curable resin (Aronix LCR series D800), and then the mixture is cured by irradiation with light having a short wavelength. The resulting cured product is cut using an ultramicrotome equipped with a diamond knife to prepare a 250-nm-thick thin sample. The cut-out sample is observed using a transmission electron microscope (JEOL Ltd., JEM-2800) (TEM-EDX). Cross-sectional images of the toner particles are captured, and elemental mapping is performed using EDX. The elements mapped are carbon, oxygen, and nitrogen.

The cross-sections of the toner particles observed are selected as described below. From the cross-sectional images of the toner particles, the cross-sectional area of each toner particle is determined, and the diameter (equivalent circular diameter) of a circle having an area equal to the cross-sectional area is determined. Only cross-sectional images of the toner particles in which the absolute value of the difference between the equivalent circular diameter and the weight-average particle size (D4) of the toner particles is 1.0 μm or less are observed.

For the domains and the matrix identified in the observation images, (intensity of oxygen element/intensity of carbon element) and/or (intensity of nitrogen element/intensity of carbon element) are calculated based on the (average) spectral intensity of each element in a 10 nm square. The ratio of the crystalline resin A and the amorphous resin P can be calculated by comparing the calculated results with the calibration curve above.

Method for Measuring Proportions of Various Monomer Units in Resin

The proportions of various monomer units in a resin are measured by $^1$H-NMR under the following conditions.

Measuring instrument: FT-NMR instrument TNM-EX400 (available from JEOL Ltd.)
Measurement frequency: 400 MHz
Pulse condition: 5.0 μs
Frequency range: 10,500 Hz
Number of acquisitions: 64
Measurement temperature: 30° C.
Sample: 50 mg of a measurement sample is placed in a sample tube having an inner diameter of 5 mm, followed by the addition of deuterated chloroform ($CDCl_3$) as a solvent. The mixture is held in a thermostatic bath at 40° C. to dissolve the measurement sample, thereby preparing the sample. As an example of measurement, the proportions of various monomer units in the vinyl polymer A are calculated as described below.

In the resulting $^1$H-NMR chart, among peaks assigned to moieties of the monomer unit A1, a peak that is independent of peaks assigned to moieties of the other monomer units is selected. The integral value S1 of this peak is calculated. Similarly, among peaks assigned to moieties of the monomer unit A2, a peak that is independent of peaks assigned to moieties of other monomer units is selected. The integral value S2 of this peak is calculated.

When the monomer unit A3 is incorporated, among peaks assigned to moieties of the monomer unit A3, a peak that is independent of peaks assigned to moieties of other monomer units is selected. The integral value S3 of this peak is then calculated.

The monomer unit A1 content is determined using the above integral values S1, S2, and S3 as described below. Note that n1, n2, and n3 are each the number of hydrogens in the moiety to which the peak of interest is assigned for each unit.

Monomer unit $A1$ content (mol %)=$\{(S1/n1)/((S1/n1)+(S2/n2)+(S3/n3))\} \times 100$ Similarly, the monomer unit A2 content and the monomer unit A3 content are determined as described below.

Monomer unit $A2$ content (mol %)=$\{(S2/n2)/((S1/n1)+(S2/n2)+(S3/n3))\} \times 100$ Monomer unit $A3$ content (mol %)=$\{(S3/n3)/((S1/n1)+(S2/n2)+(S3/n3))\} \times 100$ When a polymerizable monomer that does not contain a hydrogen atom in moieties other than a vinyl group is used in the vinyl polymer A, $^{13}$C-NMR is used, and the measurement nucleus is $^{13}$C. The measurement is performed in a single pulse mode, and the calculation is similarly performed with $^1$H-NMR.

When the toner or toner particles are used as the measurement sample, the independent peaks of the various monomer units in the vinyl polymer A are sometimes not observed due to the overlap of the peaks of the release agent and other resins. The proportions of various monomer units in the vinyl polymer A cannot be calculated, in some cases. In such a case, a vinyl polymer A' is produced by performing the same suspension polymerization without the use of the release agent or other resins. Then, the vinyl polymer A' can be regarded as the vinyl polymer A and analyzed.

When a resin, such as the amorphous polyester R is measured, the proportions of the various monomer units are also calculated using the above measuring instrument and conditions.

Method for Measuring THF-Insoluble Component Content in Resin Component

First, 1.5 g of the toner (0.7 g if the measurement sample is only the resin component), which is the measurement sample, is accurately weighed ($W_1$ [g]), placed in a cylindrical filter paper (trade name: No. 86R, size 2.8×100 mm, available from Advantec Toyo Kaisha, Ltd.) that has been accurately weighed in advance, and placed in a Soxhlet extractor.

Extraction is performed for 18 hours using 200 mL of THF as a solvent, at a reflux rate such that the solvent extraction cycle is approximately once every 5 minutes. In the case of removing the THF-insoluble component, after the extraction is completed, the cylindrical filter paper is removed, air-dried, and then vacuum-dried at 40° C. for 8 hours. The mass of the cylindrical filter paper containing the extraction residue is weighed. Then the mass of the extraction residue ($W_2$ [g]) is calculated by subtracting the mass of the cylindrical filter paper therefrom.

When a THF-soluble component is recovered, the THF-soluble component can be recovered by sufficiently removing THF from the solution of the soluble component in THF using an evaporator.

Next, the mass of the components other than the resin component ($W_3$ [g]) is determined by the following procedure. In the procedure, when the measurement sample contains only the resin component, $W_3$ is set to 0 g.

About 2 g of the toner is accurately weighed ($W_a$ [g]) in a 30-mL magnetic crucible that has been weighed in advance.

The magnetic crucible is placed in an electric furnace, heated at about 900° C. for about 3 hours, allowed to stand in the furnace, and allowed to cool in a desiccator at room temperature for 1 hour or more. The mass of the crucible containing the incinerated ash is weighed. The incinerated ash ($W_b$ [g]) is calculated by subtracting the mass of the crucible therefrom.

The mass ($W_3$ [g]) of the incinerated ash in the sample $W_1$ [g] is calculated from formula (8):

$$W_3 = W_1 \times (W_b/W_a) \qquad (8).$$

In this case, the THF-insoluble component content of the resin component in the toner can be determined from formula (9):

$$\text{THF-insoluble component content of resin component (\% by mass)} = \{(W_2 - W_3)/(W_1 - W_3)\} \times 100 \qquad (9).$$

Method for Quantifying Amount of Carbon-Carbon Double Bond Contained

An example of a method for quantifying the amount of carbon-carbon double bond contained in a polyester having carbon-carbon double bonds (double bond equivalent) is a method in which the protons or carbons of the carbon-carbon double bonds are measured and quantified by a nuclear magnetic resonance (NMR) instrument.

Sample Preparation

In an NMR sample tube, 100 mg of a sample, 10 mg of sodium trimethylsilylpropanesulfonate as an internal standard, and 10 mg of Cr(AcAc)$_3$ as a relaxation reagent are placed. Then, 0.45 mL of deuterated solvent, such as deuterated pyridine, is added to dissolve the sample sufficiently.

Measurement Conditions

Instrument: Broker BioSpin AVANCE III HD400
Measurement nucleus: $^{13}$C
Measurement frequency: 125.77 MHz
Sample spinning frequency: 6 kHz
Number of acquisitions: 24,000
Measurement temperature: room temperature Analysis and Calculation The total amount of double bonds (mmol/g) is calculated from the area ratio of the carbon peak of the double bonds originating from the unsaturated carboxylic acid component and the unsaturated alcohol component to a carbon peak originating from the methyl group of the internal standard.

For example, for the unsaturated carboxylic acid component, such as maleic acid or fumaric acid, the amount of double bonds contained (mmol/g) is calculated from the area ratio of the carbon peak of the double bond (164.6 ppm) to the carbon peak of the methyl group moiety of the internal standard (0 ppm).

Measurement of Weight-Average Molecular Weight (Mw) and Number-Average

Molecular Weight (Mn) of Resin

The molecular weight distribution (weight-average molecular weight (Mw) and number-average molecular weight (Mn)) of the resin is measured by gel permeation chromatography (GPC) as described below.

Samples are each dissolved in tetrahydrofuran (THF) over 24 hours at room temperature. The resulting solution is filtered through a "MySyori Disc" solvent-resistant membrane filter (available from Tosoh Corporation) having a pore diameter of 0.2 μm to prepare a sample solution. The sample solution is adjusted in such a manner that the concentration of THF-soluble components is 0.8% by mass. The measurement is performed using this sample solution under the following conditions.

Instrument: HLC-8120 GPC (Detector: RI) (available from Tosoh Corporation)
Column: A series of seven columns Shodex KF-801, 802, 803, 804, 805, 806, and 807 (available from Showa Denko K.K.)
Fluent: tetrahydrofuran (THF)
How rate: 1.0 mL/minute
Oven temperature: 40.0° C.
Amount of sample injected: 0.10 mL Upon calculation of the molecular weight of the sample, a molecular weight calibration curve is used which is prepared with standard polystyrene resins, such as trade name "TSK Standard Polystyrene F-850, F-450, F-288, F-128, F-80, F-40, F-20, F-10, F-4, F-2F-1, A-5000, A-2500, A-1000, and A-500" available from Tosoh Corporation.

Measurement of Maximum Endothermic Peak Temperature (Tm, Melting Point) and Amount of Heat Absorption The amount of heat absorption by the sample is measured using DSC Q1000 (available from TA instruments) under the following conditions.

Rate of temperature increase: 10° C./min
Measurement start temperature: 20° C.
Measurement end temperature: 200° C.

The melting points of indium and zinc are used to connect the temperature of the detection unit of the instrument. The melting heat of indium is used to correct the amount of heat.

Specifically, about 5 mg of the sample is accurately weighed, placed in an aluminum pan, and subjected to differential scanning calorimetry. An empty silver pan is used as a reference.

In the measurement, the temperature is increased to 200° C. once (first temperature increase process), then decreased to 20° C., and subsequently increased again (second temperature increase process). The temperature (Tm, melting point) of the peak maximum of the maximum endothermic peak in the temperature range of from 20° C. to 200° C. is determined in the DSC curve obtained in the second temperature increase process. The maximum endothermic peak is a peak at which the amount of heat absorption at a unit temperature is maximum in the temperature range of 20° C. to 200° C. The amount of heat absorption in the maximum endothermic peak indicates the integral value of the maximum endothermic peak above.

The reason why the above measurement is not performed in the first temperature increase process is that resins produced through a production process including a heat-treatment step may exhibit behavior, such as an endothermic peak due to relaxation of the resin, attributed to the heat treatment in the first temperature increase process of the DSC measurement. If this behavior overlaps with the original behavior of the sample, it may be difficult to perform accurate measurements.

However, it is known that the first temperature increase process uniformizes the behavior of the sample, and that the behavior caused by the heat treatment disappears or decreases in the second temperature increase process after the temperature of the sample is decreased. Accordingly, in the present disclosure, the above measurement is performed during the second temperature increase process in order to measure the original behavior of the sample.

$H(I)$ (J/g) and $H(T)$ (J/g) in the present disclosure are determined by formulae (11) and (12) below.

$$H(I)\ (J/g)=\{(\text{integral value of the above endothermic peak of the THF-insoluble component used as a sample})\times W_2/(W_2-W_3)\}\times 100 \quad (11)$$

$$H(T)\ (J/g)=(\text{integral value of maximum endothermic peak of the toner used as a sample})\times W_1/(W_1-W_3)\}\times 100 \quad (12)$$

In the case of using THF-insoluble component as a sample, the fine inorganic particles and the magnetic material are separated from the toner particles by a method for separating the inorganic particles described below, and then the toner particles are subjected to Soxhlet extraction as described above. In this way, the THF-insoluble component to be used as a sample can be recovered from the toner particles.

Method for Calculating SP Value

The SP value of the polymerizable monomer, the SP value of the monomer unit, and the SP value of the resin are determined according to the calculation method proposed by Fedors, as described below.

For the calculation targets, the evaporation energy ($\Delta ei$) (cal/mol) and the molar volume ($\Delta vi$) (cm³/mol) of the atoms or atomic groups (monomer units) of a molecular structure are determined from a table described in "Polym. Eng. Sci., 14(2), 147-154 (1974)". The SP value $(J/cm^3)^{0.5}$ is determined from $(4.184 \times \Sigma \Delta ei/\Sigma \Delta vi)^{0.5}$.

$SP_{A1}$ and $SP_{A2}$ are calculated by the same calculation method as above for the atoms or atomic groups of a molecular structure in the state in which the double bond of the polymerizable monomer is cleaved by polymerization.

$SP_{A1}$ and $SP_{A2}$ are determined by dividing the evaporation energy of the monomer unit by the molar volume.

$SP_A$ is determined as follows: First, the evaporation energy ($\Delta ei$) and the molar volume ($\Delta vi$) of each of the monomer units originating from the constituent polymerizable monomers are determined for each monomer unit. The product of the evaporation energy ($\Delta ei$) and the molar ratio (j) of each monomer unit in the vinyl polymer A is calculated. The product of the molar volume ($\Delta vi$) and the molar ratio (j) of each monomer unit in the vinyl polymer A is calculated. Then the sum of the evaporation energy of each monomer unit is divided by the sum of the molar volume of each monomer unit. That is, $SP_A$ is calculated from the following formula.

$$SP_A=\{4.184\times(\Sigma j\times\Sigma\Delta ei)/(\Sigma j\times\Sigma\Delta vi)\}^{0.5}$$

$SP_P$ is calculated in the same way as $SP_A$, provided that the unsaturated component added during the polymerization reaction in the production of the amorphous polyester is excluded from the calculation formula.

EXAMPLES

While the present disclosure will be specifically described below by examples, the present disclosure is not limited thereto. The term "parts" indicates "parts by mass" unless otherwise specified.

Production Example of Polymer A-1

Materials below were placed in a reaction vessel equipped with a reflux condenser, a stirrer, a thermometer, and a nitrogen inlet in a nitrogen atmosphere.

Toluene: 100.0 parts
Behenyl acrylate (first polymerizable monomer): 67.0 parts (25.3 mol %)
Acrylonitrile (second polymerizable monomer): 22.0 parts (59.5 mol %)
Styrene (third polymerizable monomer): 11.0 parts (15.2 mol %)
tert-butyl peroxypivalate (available from NOF Corporation, Perbutyl RV): 0.5 parts A polymerization reaction was performed by heating the mixture to 70° C. under stirring at 200 rpm in the reaction vessel for 12 hours, thereby preparing a solution containing a polymer of the polymerizable monomer composition dissolved in toluene. Subsequently, the solution was cooled to 25° C. and then poured into 1000.0 parts of methanol under stirring to precipitate a methanol-insoluble substance. The resulting methanol-insoluble substance was removed by filtration, washed with methanol, and vacuum-dried at 40° C. for 24 hours to give polymer A-1. The weight average molecular weight (Mw) of the polymer A-1 was 30,000, and the SPA calculated by the method described above was 20.7. The polymer A-1 was a crystalline resin that exhibited a clear endothermic peak in DSC measurement. Table 1 presents the physical properties of the polymer A-1.

Production Examples of Polymers A-2 to A-9

Polymers A-2 to A-9 were prepared in the same way as the polymer A-1, except that the amounts of polymerizable monomers were changed as given in Table 1. Each of the polymers A-2 to A-9 was a crystalline resin that exhibited a clear endothermic peak in DSC measurement. Table 1 presents the physical properties of the polymers A-2 to A-9.

MA: Methacrylic acid
St: Styrene
$SP_{A1}$, $SP_{A2}$, and $SP_A$ in Table 1 are given in units of $(J/cm^3)^{0.5}$, and were calculated using the method described above. Mw in Table 1 was measured by the method described above.

Production Example of Amorphous Resin P-1

Materials below were placed in a reaction vessel equipped with a reflux condenser, a stirrer, a thermometer, and a nitrogen inlet in a nitrogen atmosphere.
Ethylene glycol: 50.0 parts
Terephthalic acid: 50.0 parts
Titanium bis(triethanolamine)diisopropoxide: 2.5 parts The above materials were reacted at 230° C. for 2 hours under a stream of nitrogen while removing water formed. Next, the reaction was performed under a reduced pressure of 2.5 kPa for 5 hours, and then the temperature was decreased to 180° C. One part of tert-butyl catechol was added as a polymerization inhibitor, followed by the addition of 10.0 parts of fumaric acid. The mixture was allowed to react under a reduced pressure of 0.5 to 2.5 kPa for 8 hours, and then removed to give amorphous resin P-1. Table 2 presents the physical properties of the amorphous resin P-1.

Production Examples of Amorphous Resins P-2 to P-9

Amorphous resins P-2 to P-9 were prepared in the same way as the amorphous resin P-1, except that the amounts of

TABLE 1

| | First polymerizable monomer | | | Second polymerizable monomer | | | Third polymerizable monomer | | | | | | |
| --- | --- | --- | --- | --- | --- | --- | --- | --- | --- | --- | --- | --- | --- |
| Polymer | Type | Parts | mol % | Type | Parts | mol % | Type | Parts | mol % | Mw | $SP_{A1}$ | $SP_{A2}$ | $SP_A$ |
| A-1 | BEA | 67.0 | 25.3 | AN | 22.0 | 59.5 | St | 11.0 | 15.2 | 30,000 | 18.25 | 29.4 | 20.7 |
| A-2 | BEA | 84.0 | 52.5 | AN | 5.0 | 22.4 | St | 11.0 | 25.1 | 32,000 | 18.25 | 29.4 | 19.0 |
| A-3 | BEA | 42.0 | 11.7 | AN | 30.0 | 59.9 | St | 28.0 | 28.5 | 29,000 | 18.25 | 29.4 | 21.8 |
| A-4 | BEA | 57.0 | 16.9 | AN | 35.0 | 74.4 | St | 8.0 | 8.7 | 29,000 | 18.25 | 29.4 | 22.0 |
| A-5 | BEA | 64.0 | 23.2 | AN | 22.0 | 57.3 | St | 11.0 | 14.6 | 30,000 | 18.25 | 29.4 | 20.8 |
| | | | | MA | 3.0 | 4.8 | | | | | | 25.6 | |
| A-6 | BEA | 75.0 | 42.4 | AN | 3.0 | 12.1 | St | 22.0 | 45.5 | 32,000 | 18.25 | 29.4 | 18.9 |
| A-7 | BEA | 20.0 | 3.9 | AN | 56.0 | 78.9 | St | 24.0 | 17.2 | 28,000 | 18.25 | 29.4 | 24.6 |

The abbreviations in Table 1 are described below.
BEA: Behenyl acrylate
AN: Acrylonitrile polymerizable monomers were changed as given in Table 2. Table 2 presents the physical properties of the amorphous resins P-2 to P-9.

TABLE 2

| Amorphous resin | Polymerizable monomer (alcohol component) | | | Polymerizable monomer (acid component) | | Polymerizable monomer (unsaturated component) | | | Double bond equivalent (mmol/g) | $SP_P$ $(J/cm^3)^{0.5}$ |
| --- | --- | --- | --- | --- | --- | --- | --- | --- | --- | --- |
| | Type | Number of carbon atoms | Parts | Type | Parts | Type | Parts | Mw | | |
| P-1 | EG | 2 | 50.0 | TPA | 50.0 | FuA | 10.0 | 20,000 | 0.40 | 28.7 |
| P-2 | EG | 2 | 50.0 | TPA | 50.0 | FuA | 14.0 | 20,000 | 0.55 | 28.7 |
| P-3 | EG | 2 | 50.0 | TPA | 50.0 | FuA | 6.0 | 20,000 | 0.23 | 28.7 |
| P-4 | EG | 2 | 30.0 | TPA | 50.0 | FuA | 10.0 | 25,000 | 0.40 | 29.2 |
| | PeE | 5 | 20.0 | | | | | | | |
| P-5 | EG | 2 | 25.0 | TPA | 50.0 | FuA | 10.0 | 24,000 | 0.39 | 27.1 |
| | NPG | 5 | 25.0 | | | | | | | |
| P-6 | EG | 2 | 30.0 | TPA | 50.0 | FuA | 10.0 | 32,000 | 0.43 | 27.1 |
| | BPA-EO | 19 | 20.0 | | | | | | | |

TABLE 2-continued

| Amorphous resin | Polymerizable monomer (alcohol component) | | | Polymerizable monomer (acid component) | | Polymerizable monomer (unsaturated component) | | Mw | Double bond equivalent (mmol/g) | $SP_P$ $(J/cm^3)^{0.5}$ |
|---|---|---|---|---|---|---|---|---|---|---|
| | Type | Number of carbon atoms | Parts | Type | Parts | Type | Parts | | | |
| P-7 | EG | 2 | 20.0 | TPA | 50.0 | FuA | 10.0 | 34,000 | 0.41 | 26.2 |
| | BPA-EO | 19 | 30.0 | | | | | | | |
| P-8 | EG | 2 | 30.0 | TPA | 50.0 | — | — | 17,000 | 0.01 | 27.1 |
| | BPA-EO | 19 | 20.0 | | | | | | | |
| P-9 | BPA-PO | 21 | 50.0 | TPA | 24.0 | FuA | 10.0 | 20,000 | 0.39 | 23.5 |
| | | | | ADA | 26.0 | | | | | |

The abbreviations in Table 2 are described below.
EG: Ethylene glycol
PeE: Pentaerythritol
NPG: Neopentyl glycol
BPA-EO: Bisphenol A-ethylene oxide adduct (average amount by mole of ethylene oxide added: 2.0)
BPA-PO: Bisphenol A-propylene oxide adduct (average amount by mole of propylene oxide added: 2.0)
TPA: Terephthalic acid
ADA: Adipic acid
FuA: Fumaric acid Mw and double bond equivalents in Table 2 were measured by the above measurement methods, and $SP_P$ was calculated by the above calculation method.

Production Example of Binder Resin C-1

First, 60 parts of the polymer A-1 and 40 parts of the amorphous resin P-1 were mixed together and fed into a twin-screw kneader (Kurimoto Ltd., S5KRC kneader) at a feed rate of 40 kg/hour. At the same time, 3.0 parts of tert-butyl peroxyisopropyl monocarbonate was fed as a radical reaction initiator at a feed rate of 0.4 kg/hour. The mixture was reacted by kneading and extruding at 160° C. for 5 minutes at 100 rpm. In addition, the mixture was mixed with nitrogen flowing from the vent to remove the organic solvent. The product obtained from the mixing was cooled to give binder resin C-1.

Production Examples of Binder Resins to C-21

Binder resins C-2 to C-21 were prepared in the same way as the binder resin C-1, except that the polymer A and the amorphous resin P used were changed as given in Table 3.

TABLE 3

| | Polymer A | | Amorphous resin P | | tert-Butyl peroxyisopropyl monocarbonate | $\|SP_P - SP_A\|$ $(J/cm^3)^{0.5}$ | $\|SP_P - SP_{A2}\|$ $(J/cm^3)^{0.5}$ |
|---|---|---|---|---|---|---|---|
| | Type | Amount added (parts by mass) | Type | Amount added (parts by mass) | Amount added (parts by mass) | | |
| Binder resin C-1 | A-1 | 60.0 | P-1 | 40.0 | 4.0 | 8.0 | 0.7 |
| Binder resin C-2 | A-1 | 60.0 | P-2 | 40.0 | 4.0 | 8.0 | 0.7 |
| Binder resin C-3 | A-1 | 60.0 | P-3 | 40.0 | 4.0 | 8.0 | 0.7 |
| Binder resin C-4 | A-1 | 60.0 | P-4 | 40.0 | 4.0 | 8.5 | 0.2 |
| Binder resin C-5 | A-1 | 60.0 | P-5 | 40.0 | 4.0 | 6.4 | 2.3 |
| Binder resin C-6 | A-1 | 40.0 | P-1 | 60.0 | 3.5 | 8.0 | 0.7 |
| Binder resin C-7 | A-1 | 90.0 | P-1 | 10.0 | 5.0 | 8.0 | 0.7 |
| Binder resin C-8 | A-2 | 60.0 | P-1 | 40.0 | 4.0 | 9.7 | 0.7 |
| Binder resin C-9 | A-3 | 60.0 | P-1 | 40.0 | 4.0 | 6.9 | 0.7 |
| Binder resin C-10 | A-4 | 60.0 | P-1 | 40.0 | 4.0 | 6.7 | 0.7 |
| Binder resin C-11 | A-5 | 60.0 | P-1 | 40.0 | 4.0 | 7.9 | 0.7[1] |
| | | | | | | | 3.1[2] |
| Binder resin C-12 | A-6 | 60.0 | P-4 | 40.0 | 4.0 | 8.0 | 0.7 |
| Binder resin C-13 | A-7 | 60.0 | P-5 | 40.0 | 4.0 | 8.0 | 0.7 |
| Binder resin C-14 | A-1 | 60.0 | P-3 | 40.0 | 4.0 | 8.0 | 0.7 |
| Binder resin C-15 | A-8 | 60.0 | P-1 | 40.0 | 3.0 | 9.8 | 0.7 |
| Binder resin C-16 | A-1 | 60.0 | P-6 | 40.0 | 4.0 | 6.4 | 2.3 |
| Binder resin C-17 | A-1 | 60.0 | P-7 | 40.0 | 4.0 | 5.5 | 3.2 |
| Binder resin C-18 | A-9 | 40.0 | P-1 | 60.0 | 4.0 | 4.1 | 0.7 |
| Binder resin C-19 | A-1 | 60.0 | P-8 | 40.0 | 0.0 | 6.4 | 2.3 |
| Binder resin C-20 | A-1 | 60.0 | P-9 | 40.0 | 4.0 | 2.8 | 5.9 |
| Binder resin C-21 | A-1 | 25.0 | P-1 | 75.0 | 4.0 | 8.0 | 0.7 |

$SP_P$ and $SP_A$ in Table 3 were calculated from the above calculation methods. [1]The value of $|SP_P - SP_{A2}|(J/cm^3)^{0.5}$ where $SP_{A2}$ is the SP value of acrylonitrile shown in Table 1. [2]The value of $|SP_P - SP_{A2}|(J/cm^3)^{0.5}$ where $SP_{A2}$ is the SP value of methacrylic acid shown in Table 1.

Production Example of Toner 1

Binder resin C-1: 100 parts by mass
Carbon black (NIPex 35, available from Orion Engineered Carbons): 5.0 parts by mass
Release agent (Excerex 15341PA, available from Mitsui Chemicals, Inc.): 5.0 parts by mass The above materials were pre-mixed in a Henschel mixer, and then melt-kneaded using a twin-screw extruder (trade name: PCM-30, available from Ikegai Corp.) at a temperature such that the temperature of the melt at the discharge port was 150° C. The resulting kneaded material was cooled, roughly crushed with a hammer mill, and then finely pulverized using a pulverizer (trade name: Turbo Mill T250, available from Turbo Kogyo Co., Ltd). The resulting finely pulverized powder was classified with a multi-segment classifier using the Coanda effect to provide toner particles 1 having a weight-average particle size (D4) of 7.2 μm.

To 100.0 parts by mass of the toner particles 1, 1.0 part by mass of a hydrophobic fine silica powder (number-average particle size of primary particles: 10 nm) surface-treated with hexamethyldisilazane was added. The mixture was mixed at 3,200 rpm for 2 minutes using a Henschel mixer to provide toner 1. Table 4 presents the physical properties of the toner 1.

Production Examples of Toners 2 to 21

Toners 2 to 21 were produced in the same way as the toner 1, except that the type of binder resin C-1 used was changed as given in Table 4. Table 4 presents the physical properties of the resulting toners 2 to 21.

In the cross-sectional observation of the toner particles, among the toners 1 to 21, toner particles containing domains having a major diameter of 5.0 μm or more were observed only in the toner 20 and were not observed in the other toilers.

Evaluation of Low-Temperature Fixability of Loner

For the evaluation of the low-temperature fixability, a color laser printer (trade name: HP Color LaserJet 3525dn, available from HP) was modified and used as an image-forming apparatus, and white paper (Office Planner: 64 g/m², available from CANON KABUSHIKI KAISHA) was used as evaluation paper. The image-forming apparatus was modified in such a manner that the fixing temperature and the process speed could be changed and the fixing unit was detachable.

The fixing unit was removed from the above image-forming apparatus. Toner was removed from the black cartridge. The cartridge was filled with 100 g of the toner 1.

Unfixed toner images having a length of 2.0 cm, a width of 15.0 cm, and a toner bearing amount of 0.9 mg/cm² were each formed with the image-forming apparatus on the evaluation paper at 1.0 cm away from the leading edge of the paper in the sheet passing direction.

An external fixing device configured to operate even outside the laser beam printer was used to fix the unfixed images. In a normal-temperature and normal-humidity environment (23° C., 60% RH), the process speed of the external fixing device was set to 410 minis. The initial temperature was set at 100° C., and the set temperature was increased sequentially by 5° C. The above unfixed images were fixed at each temperature. For each of the resulting fixed image, the minimum fixing temperature at which low-temperature offset did not occur was determined. The value of this minimum fixing temperature was used to evaluate the low-

TABLE 4

| | Binder resin | Domain-matrix structure | | Number of toner particles with major diameter of | THF-insoluble component content | THF-insoluble component Tm | THF-insoluble component H(I) | H(I)/H(T) | Polymer A content of resin component |
|---|---|---|---|---|---|---|---|---|---|
| | | Type | Matrix | Domain | 1.0 μm or less | (% by mass) | (° C.) | (J/g) | (%) | (% by mass) |
| Toner 1 | C-1 | crystalline | amorphous | 78 | 50 | 62.0 | 26.2 | 4.6 | 50 |
| Toner 2 | C-2 | crystalline | amorphous | 52 | 68 | 62.0 | 30.2 | 5.5 | 32 |
| Toner 3 | C-3 | crystalline | amorphous | 79 | 31 | 62.0 | 22.2 | 4.0 | 69 |
| Toner 4 | C-4 | crystalline | amorphous | 87 | 52 | 61.0 | 26.5 | 4.6 | 48 |
| Toner 5 | C-5 | crystalline | amorphous | 38 | 52 | 62.0 | 25.4 | 5.0 | 48 |
| Toner 6 | C-6 | crystalline | amorphous | 70 | 55 | 62.0 | 19.8 | 5.1 | 45 |
| Toner 7 | C-7 | crystalline | amorphous | 50 | 40 | 62.0 | 75.5 | 10.1 | 60 |
| Toner 8 | C-8 | crystalline | amorphous | 36 | 51 | 61.0 | 70.2 | 9.2 | 49 |
| Toner 9 | C-9 | crystalline | amorphous | 62 | 50 | 62.0 | 11.3 | 4.2 | 50 |
| Toner 10 | C-10 | crystalline | amorphous | 75 | 54 | 62.0 | 16.6 | 4.5 | 46 |
| Toner 11 | C-11 | crystalline | amorphous | 90 | 51 | 64.0 | 30.0 | 4.4 | 49 |
| Toner 12 | C-12 | crystalline | amorphous | 68 | 49 | 76.0 | 24.3 | 5.0 | 51 |
| Toner 13 | C-13 | crystalline | amorphous | 80 | 53 | 56.0 | 28.6 | 5.1 | 47 |
| Toner 14 | C-14 | crystalline | amorphous | 80 | 23 | 62.0 | 20.2 | 3.7 | 77 |
| Toner 15 | C-15 | crystalline | amorphous | 28 | 55 | 61.0 | 68.8 | 9.8 | 45 |
| Toner 16 | C-16 | crystalline | amorphous | 26 | 47 | 62.0 | 25.5 | 4.9 | 53 |
| Toner 17 | C-17 | crystalline | amorphous | 22 | 50 | 62.0 | 27.1 | 4.8 | 50 |
| Toner 18 | C-18 | crystalline | amorphous | 14 | 65 | 59.0 | 8.2 | 2.8 | 35 |
| Toner 19 | C-19 | crystalline | amorphous | 92 | 0 | — | — | — | 60 |
| Toner 20 | C-20 | crystalline | amorphous | 9 | 52 | 60.0 | 28.4 | 5.5 | 48 |
| Toner 21 | C-21 | amorphous | crystalline | — | 73 | 61.0 | 9.2 | 3.7 | 27 |

The physical properties of the toner in Table 4 were measured by the above measurement methods. The polymer A content of the resin component is a value calculated as the percentage of the mass of the polymer A soluble in THF based on the mass of the resin component.

Example 1

The toner 1 was evaluated as described below. Table 5 presents the evaluation results.

temperature fixability of the toner. The toner that exhibited a minimum fixing temperature of lower than 135° C. was determined to be one that provided the advantageous effects of the present disclosure. Table 5 presents the evaluation results.

The term "low-temperature offset" refers to a visible image defect due to the fact that the fixing temperature is not sufficiently high to melt the toner.

Evaluation of High-Temperature Offset Resistance of Toner

The high-temperature offset resistance of the toner 1 was evaluated as described below using the same image-forming apparatus and evaluation paper used in the above evaluation of the low-temperature fixability of the toner. The evaluation method was as follows: The toner was fixed at a temperature that easily caused high-temperature offset of the toner. The difference between the reflection density at the position where high-temperature offset occurred and the reflection density of a white background portion on which no toner was placed was measured.

An unfixed image having a length of 100 mm, a width of 100 mm, and a toner bearing amount of 0.3 mg/cm$^2$ was formed using the filled toner 1 on the evaluation paper with a margin of 5 mm at the leading edge with the above image-forming apparatus.

In this evaluation, the external fixing device configured to operate even outside the laser beam printer was also used to fix the unfixed image. In a normal-temperature and normal-humidity environment (23° C., 50% RH), fixing was performed with the external fixing device set at a process speed of 410 mm/s and a fixing temperature of 200° C. to provide a fixed image. The reflection density at the position where a toner offset occurred in the resulting fixed image was measured. The reflection density was measured with a Macbeth densitometer, which is a reflection densitometer, (available from Macbeth) using an SPI filter. The absolute value of the difference between the reflection density of the white background portion on which no toner was placed and the reflection density of the position where the offset occurred was defined as an offset density. This value was used to evaluate the high-temperature offset resistance of the toner. The toner that exhibited an offset density of less than 0.15 was determined to be one that provided the advantageous effects of the present disclosure. Table 5 presents the evaluation results.

Evaluation of Developing Performance of Toner

Using the same image-forming apparatus and evaluation paper used in the above evaluation of the low-temperature fixability of the toner, a transverse line pattern with a printing ratio of 1% was formed on two sheets per job. Setting was made in such a manner that the apparatus was stopped once between the jobs and then the next job was started. At this setting, 20,000 sheets were output in total. After that, one sheet of white image evaluation paper with a printing ratio of 0% was output. Then, the white image evaluation paper was evaluated according to the following criteria. This was used to evaluate the developing performance of the toner 1. The evaluation was performed in a low-temperature and low-humidity environment (temperature: 15° C., humidity: 10% RH), where the toner tends to be overcharged and the non-image region is easily soiled.

For the measurement of the white image evaluation paper, a reflectometer (Model TC-6DS reflectometer, available from Tokyo Denshoku Co., Ltd.) that can measure the reflection density was used. The minimum reflection density of the entire white image evaluation paper after output was designated as Ds, and the average reflection density of the white image evaluation paper before output was designated as Dr. The developing performance was evaluated using (Dr-Ds) as an index. Dr was the average reflection density of the five points measured at the four corners and the middle of the evaluation paper.

Thus, a smaller value of (Dr-Ds) indicates that the toner has better developing performance. The toner that exhibited a value of (Dr-Ds) of less than 2.5 was determined to be one that provided the advantageous effects of the present disclosure. Table 5 presents the evaluation results.

Examples 2 to 17

The toners 2 to 17 were evaluated in the same manner as in Example 1. Table 5 presents the evaluation results.

Comparative Examples 1 to 4

The toners 18 to 21 were evaluated in the same manner as in Example 1. Table 5 presents the evaluation results.

TABLE 5

|  |  | Low-temperature fixability Minimum fixing temperature | High-temperature offset resistance Offset density | Developing performance Dr - Ds |
|---|---|---|---|---|
| Example 1 | Toner 1 | 115° C. | 0.02 | 0.3 |
| Example 2 | Toner 2 | 118° C. | 0.01 | 0.3 |
| Example 3 | Toner 3 | 110° C. | 0.05 | 0.3 |
| Example 4 | Toner 4 | 116° C. | 0.02 | 0.2 |
| Example 5 | Toner 5 | 115° C. | 0.03 | 0.7 |
| Example 6 | Toner 6 | 125° C. | 0.01 | 0.2 |
| Example 7 | Toner 7 | 105° C. | 0.06 | 2.0 |
| Example 8 | Toner 8 | 108° C. | 0.02 | 0.8 |
| Example 9 | Toner 9 | 130° C. | 0.04 | 0.4 |
| Example 10 | Toner 10 | 125° C. | 0.02 | 0.3 |
| Example 11 | Toner 11 | 103° C. | 0.02 | 0.3 |
| Example 12 | Toner 12 | 131° C. | 0.02 | 0.3 |
| Example 13 | Toner 13 | 118° C. | 0.06 | 0.3 |
| Example 14 | Toner 14 | 110° C. | 0.12 | 0.6 |
| Example 15 | Toner 15 | 110° C. | 0.05 | 2.2 |
| Example 16 | Toner 16 | 118° C. | 0.07 | 2.2 |
| Example 17 | Toner 17 | 125° C. | 0.09 | 2.4 |
| Comparative example 1 | Toner 18 | 140° C. | 0.13 | 2.2 |
| Comparative example 2 | Toner 19 | 124° C. | 0.25 | 4.2 |
| Comparative example 3 | Toner 20 | 122° C. | 0.16 | 3.0 |
| Comparative example 4 | Toner 21 | 152° C. | 0.11 | 2.5 |

What is claimed is:

1. A toner, comprising:
    toner particles containing:
        a resin component containing:
            a crystalline resin and an amorphous resin,
    wherein the resin component contains a tetrahydrofuran-insoluble component, and
    a content of the tetrahydrofuran-insoluble component with respect to a content of the resin component is 5.0% to 80.0% by mass,
    wherein when a maximum endothermic peak temperature in a differential scanning calorimetry measurement (DSC measurement) of the tetrahydrofuran-insoluble component is defined as Tm [° C.], and when an amount of heat absorption in the maximum endothermic peak determined from DSC measurement of the tetrahydrofuran-insoluble component is defined as H(I) [J/g],
    Tm [° C.] satisfies formula (1):

$$55.0 \leq Tm \leq 80.0 \quad (1), \text{ and}$$

H(I) [J/g] satisfies formula (2):

$$10.0 \leq H(I) \leq 80.0 \quad (2), \text{ and}$$

wherein when cross sections of 100 particles of the toner particles are observed,
    each of the cross sections has a domain-matrix structure which comprises a matrix containing the crystalline resin, and domains each of which contains the amorphous resin, and
    among the 100 particles, the number of particle in which all the domains have a major diameter of 1.0 μm or less is 20 particles or more, and
    wherein the crystalline resin comprises a vinyl polymer A containing a monomer unit A1 represented by formula (A):

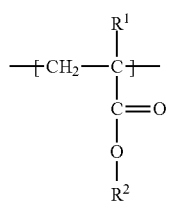

(A)

where in formula (A), $R^1$ is H or $CH_3$, and $R^2$ is an alkyl group having 18 to 36 carbon atoms.

2. The toner according to claim 1,
    wherein when an amount of heat absorption in a maximum endothermic peak determined from DSC measurement of the toner is defined as H(T) [J/g], H(I) [J/g] and H(T) [J/g] satisfy formula (3):

$$3.0\% \leq H(I)/H(T) \leq 20.0\% \quad (3).$$

3. The toner according to claim 1,
    wherein a content of the monomer unit A1 with respect to a content of the vinyl polymer A is 30.0% to 99.9% by mass.

4. The toner according to claim 1,
    wherein the vinyl polymer A further contains a monomer unit A2, and
    wherein when an SP value of the monomer unit A1 is defined as $SP_{A1}$ $(J/cm^3)^{0.5}$, and
    when an SP value of the monomer unit A2 is defined as $SP_{A2}$ $(J/cm^3)^{0.5}$ $SP_{A1}$ and $SP_{A2}$ satisfy formula (4):

$$3.0 \leq SP_{A2} - SP_{A1} \leq 25.0 \quad (4).$$

5. The toner according to claim 1,
    wherein the vinyl polymer A further contains a monomer unit A2,
    the monomer unit A2 is at least one monomer unit selected from the group consisting of a monomer unit represented by formula (A21) below and a monomer unit represented by formula (A22) below:

(A21)

(A22)

where in formulae (A21) and (A22),
    X is a single bond or an alkylene group having 1 to 6 carbon atoms,
    $R^4$ is a cyano group (—C≡N), —C(═O)NHR$^7$ (where $R^7$ is a hydrogen atom or an alkyl group having 1 to 4 carbon atoms), a hydroxy group, —COOR$^8$ (where $R^8$ is an alkyl group having 1 to 6 carbon atoms or a hydroxyalkyl group having 1 to 6 carbon atoms), —NHCOOR$^9$ (where $R^9$ is an alkyl group having 1 to 4 carbon atoms), —NH—C(═O)—NH(R$^{10}$)$_2$ (where each $R^{10}$ is independently a hydrogen atom or alkyl group having 1 to 6 carbon atoms), —COO(CH$_2$)$_2$NHCOOR$^{11}$ (where $R^{11}$ is an alkyl group having 1 to 4 carbon atoms) or —COO(CH$_2$)$_2$—NH—C(═O)—NH (R$^{12}$)$_2$ (where each $R^{12}$ is independently hydrogen atom or an alkyl group having 1 to 6 carbon atoms),
    $R^6$ is an alkyl group having 1 to 4 carbon atoms, and
    $R^3$ and $R^5$ are each independently a hydrogen atom or $CH_3$.

6. The toner according to claim 4,
    wherein a content of the monomer unit A2 with respect to a content of the vinyl polymer A is 1.0% to 70.0% by mass.

7. The toner according to claim 5,
    wherein a content of the monomer unit A2 with respect to a content of the vinyl polymer A is 1.0% to 70.0% by mass.

8. The toner according to claim 5,
wherein the vinyl polymer A further contains a monomer unit A3,
the monomer unit A3 is at least one monomer unit selected from the group consisting of a monomer unit represented by formula (A31) and a monomer unit represented by formula (A32):

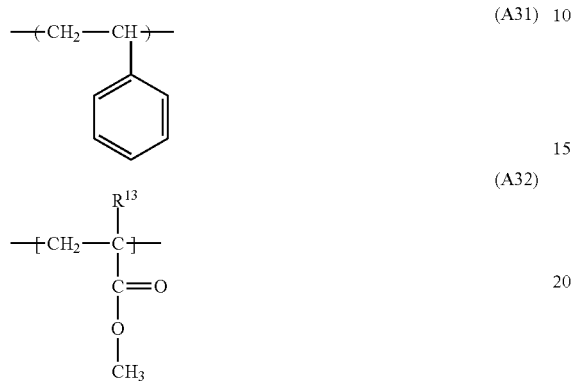

(A31)

(A32)

where in formula (A32), $R^{13}$ is H or $CH_3$.

9. The toner according to claim 1,
wherein a content of the tetrahydrofuran-insoluble component with respect to a content of the resin component is 30.0% to 80.0% by mass.

* * * * *